(12) United States Patent
Yonemura et al.

(10) Patent No.: US 10,545,885 B2
(45) Date of Patent: Jan. 28, 2020

(54) INFORMATION PROCESSING DEVICE, INFORMATION PROCESSING METHOD, AND COMPUTER PROGRAM PRODUCT

(71) Applicant: Kabushiki Kaisha Toshiba, Minato-ku (JP)

(72) Inventors: Tomoko Yonemura, Kawasaki (JP); Ryuta Nara, Fuchu (JP)

(73) Assignee: Kabushiki Kaisha Toshiba, Minato-ku (JP)

( * ) Notice: Subject to any disclaimer, the term of this patent is extended or adjusted under 35 U.S.C. 154(b) by 68 days.

(21) Appl. No.: 15/911,328

(22) Filed: Mar. 5, 2018

(65) Prior Publication Data

US 2019/0171585 A1 Jun. 6, 2019

(30) Foreign Application Priority Data

Dec. 1, 2017 (JP) .................................. 2017-232039

(51) Int. Cl.
*G06F 13/00* (2006.01)
*G06F 12/14* (2006.01)
(Continued)

(52) U.S. Cl.
CPC ...... *G06F 12/1483* (2013.01); *G06F 11/3037* (2013.01); *G06F 12/0246* (2013.01);
(Continued)

(58) Field of Classification Search
CPC ............. G06F 12/1483; G06F 11/3037; G06F 12/0246; G06F 12/1475; G06F 13/1663; G06F 21/78; G06F 2212/1052
See application file for complete search history.

(56) References Cited

U.S. PATENT DOCUMENTS

2010/0192230 A1\* 7/2010 Steeves .................. H04L 63/08
   726/26
2013/0291053 A1\* 10/2013 Buer ....................... G06F 21/53
   726/1
(Continued)

FOREIGN PATENT DOCUMENTS

JP 2015-170887 9/2015
JP 2016-143120 8/2016
JP 6117068 4/2017

*Primary Examiner* — Sean D Rossiter
(74) *Attorney, Agent, or Firm* — Oblon, McClelland, Maier & Neustadt, L.L.P.

(57) ABSTRACT

According to an embodiment, an information processing device includes a monitoring circuit, a non-secure processing circuit, a secure processing circuit, memory access control circuit. The monitoring circuit switches mode between a non-secure mode and a secure mode. The non-secure processing circuit runs in the non-secure mode, and reads communication data from and writes communication data in a shared memory. The secure processing circuit runs in the secure mode, and reads the communication data from the shared memory and writes the communication data in a storage. The memory access control circuit manages access from the non-secure processing circuit and the secure processing circuit based on a memory access control table in which physical addresses in the shared memory are associated with state information either indicating a locked state for not allowing writing but allowing reading by the non-secure processing circuit or indicating an unlocked state attained by cancelling the locked state.

13 Claims, 14 Drawing Sheets

(51) Int. Cl.
  *G06F 12/02*    (2006.01)
  *G06F 21/78*    (2013.01)
  *G06F 11/30*    (2006.01)
  *G06F 13/16*    (2006.01)

(52) U.S. Cl.
  CPC ...... *G06F 12/1475* (2013.01); *G06F 13/1663* (2013.01); *G06F 21/78* (2013.01); *G06F 2212/1052* (2013.01)

(56) References Cited

U.S. PATENT DOCUMENTS

| | | | |
|---|---|---|---|
| 2014/0115656 A1* | 4/2014 | Kim | G06F 21/78 |
| | | | 726/1 |
| 2014/0123320 A1* | 5/2014 | Isozaki | G06F 21/44 |
| | | | 726/29 |
| 2014/0298026 A1* | 10/2014 | Isozaki | H04L 9/0825 |
| | | | 713/171 |
| 2015/0089246 A1 | 3/2015 | Kanai et al. | |
| 2015/0370726 A1* | 12/2015 | Hashimoto | G06F 21/575 |
| | | | 711/163 |
| 2016/0224482 A1 | 8/2016 | Murata | |
| 2016/0379004 A1* | 12/2016 | Cho | G06F 21/6218 |
| | | | 726/26 |

* cited by examiner

FIG.4

NON-SECURE PAGE TABLE 34

| VIRTUAL ADDRESS | PHYSICAL ADDRESS |
|---|---|
| 01 | 01 |
| 02 | 02 |
| | |

SECURE PAGE TABLE 35

| VIRTUAL ADDRESS | PHYSICAL ADDRESS |
|---|---|
| 01 | 01 |
| 02 | 02 |
| | |

MEMORY ACCESS CONTROL TABLE 36

| PHYSICAL ADDRESS | SIZE | STATE INFORMATION |
|---|---|---|
| 01 | xxxxx | LOCKED STATE |
| 02 | yyyyy | UNLOCKED STATE |
| | | |

FIG.12

NON-SECURE PAGE TABLE ~34

| VIRTUAL ADDRESS | PHYSICAL ADDRESS | |
|---|---|---|
| 01 | 01 | DATA 1 |
| | | |
| | | |

SECURE PAGE TABLE ~35

| VIRTUAL ADDRESS | PHYSICAL ADDRESS | |
|---|---|---|
| 01 | 01 | DATA 1 |
| | | |
| | | |

MEMORY ACCESS CONTROL TABLE ~36

| PHYSICAL ADDRESS | SIZE | STATE INFORMATION | |
|---|---|---|---|
| 01 | xxxxx | LOCKED STATE | DATA 1 |
| | | | |
| | | | |

FIG.13

NON-SECURE PAGE TABLE ~34

| VIRTUAL ADDRESS | PHYSICAL ADDRESS | |
|---|---|---|
| 01 | 01 | DATA 2 |
| | | |
| | | |

SECURE PAGE TABLE ~35

| VIRTUAL ADDRESS | PHYSICAL ADDRESS | |
|---|---|---|
| 01 | 01 | DATA 2 |
| 02 | 02 | DATA 1 |
| | | |

MEMORY ACCESS CONTROL TABLE ~36

| PHYSICAL ADDRESS | SIZE | STATE INFORMATION | |
|---|---|---|---|
| 01 | xxxxx | UNLOCKED STATE | DATA 2 |
| 02 | yyyyy | LOCKED STATE | DATA 1 |
| | | | |

FIG.14

NON-SECURE PAGE TABLE ~34

| VIRTUAL ADDRESS | PHYSICAL ADDRESS | |
|---|---|---|
| 01 | 02 | DATA 2 |
| | | |
| | | |

SECURE PAGE TABLE ~35

| VIRTUAL ADDRESS | PHYSICAL ADDRESS | |
|---|---|---|
| 01 | 02 | DATA 2 |
| 02 | 01 | DATA 1 |
| | | |

MEMORY ACCESS CONTROL TABLE ~36

| PHYSICAL ADDRESS | SIZE | STATE INFORMATION | |
|---|---|---|---|
| 01 | xxxxx | LOCKED STATE | DATA 1 |
| 02 | yyyyy | UNLOCKED STATE | DATA 2 |
| | | | |

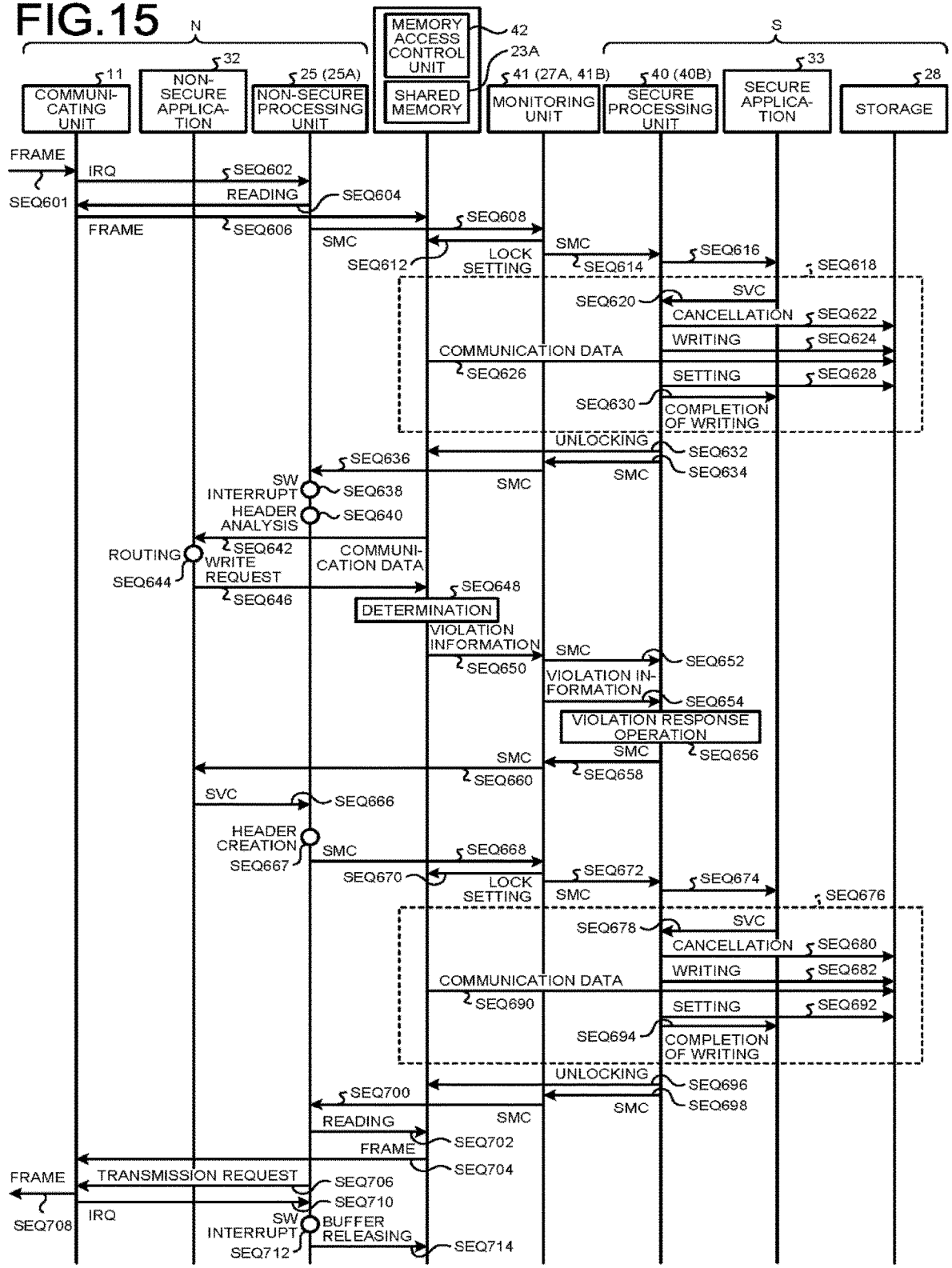

INFORMATION PROCESSING DEVICE, INFORMATION PROCESSING METHOD, AND COMPUTER PROGRAM PRODUCT

CROSS-REFERENCE TO RELATED APPLICATIONS

This application is based upon and claims the benefit of priority from Japanese Patent Application No. 2017-232039, filed on Dec. 1, 2017; the entire contents of which are incorporated herein by reference.

FIELD

Embodiments described herein relate generally to an information processing device, an information processing method, and a computer program product.

BACKGROUND

A system is known in which operations such as transfer and logging of communication data is performed among a plurality of operating systems (OSs) or among a plurality of virtual machines.

For example, the data that is stored in a memory used by applications is stored in a memory for one OS or one virtual machine or in a memory used by applications in one OS or one virtual machine, and is then replicated in a shared memory or in a storage via a memory for another OS or another virtual machine. However, conventionally, at the time of performing logging or routing of communication data, the same communication data needs to be replicated in a plurality of memories, thereby leading to an increase in the required memory size.

BRIEF DESCRIPTION OF THE DRAWINGS

FIG. 4 is a schematic diagram illustrating data structures of a non-secure page table, a secure page table, and a memory access control table;

FIGS. 12 to 14 are explanatory diagrams for explaining a violation response operation; and FIGS. 15 and 16 are sequence diagrams illustrating a flow of a communication operation.

DETAILED DESCRIPTION

According to an embodiment, an information processing device includes a monitoring circuit, a non-secure processing circuit, a secure processing circuit, memory access control circuit. The monitoring circuit switches mode between a non-secure mode and a secure mode. The non-secure processing circuit runs in the non-secure mode, and reads communication data from and writes communication data in a shared memory. The secure processing circuit runs in the secure mode, and reads the communication data from the shared memory and writes the communication data in a storage. The memory access control circuit manages access from the non-secure processing circuit and the secure processing circuit based on a memory access control table in which physical addresses in the shared memory are associated with state information either indicating a locked state for not allowing writing but allowing reading by the non-secure processing unit or indicating an unlocked state attained by cancelling the locked state.

Exemplary embodiments of an information processing device, an information processing method, and a computer program product are described below in detail with reference to the accompanying drawings.

The information processing system according to the embodiments can be implemented in an in-vehicle network system (a communication system) that is installed in an automobile representing an example of a moving object. In the following explanation, the explanation is given for an example in which an in-vehicle gateway device (in the following explanation, abbreviated as "GW") that is included in the in-vehicle network system is configured as the information processing device according to the embodiments.

Meanwhile, the devices or the systems in which the information processing system according to the embodiments can be implemented are not limited to the examples given below. That is, the information processing system according to the embodiments can be widely implemented in various systems that communicate communication data.

First Embodiment

Figure 1:
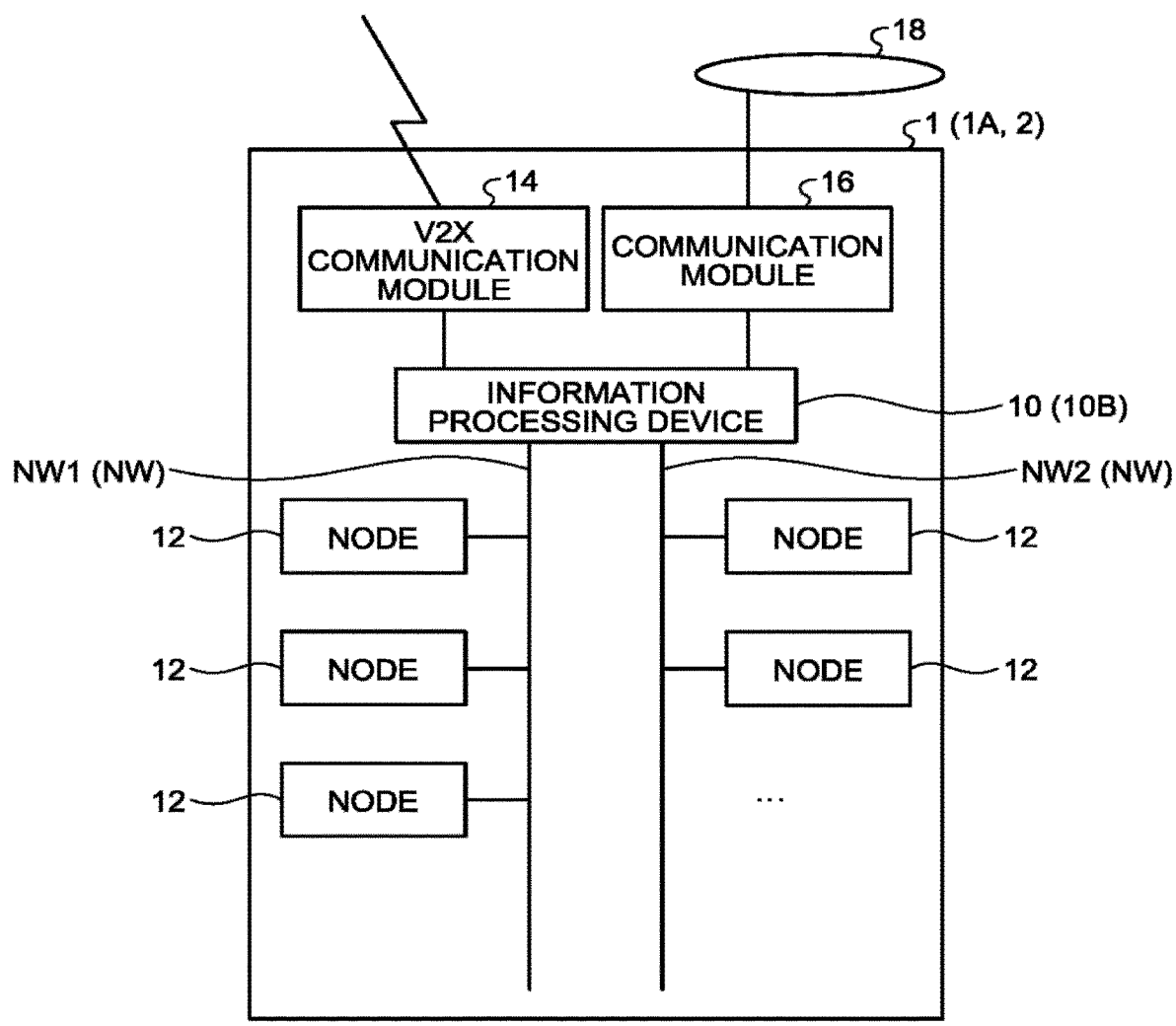
FIG. 1 is a schematic diagram illustrating an overview of an information processing system.

FIG. 1 is a schematic diagram illustrating an overview of an information processing system 1. The information processing system 1 is installed in a vehicle 2, for example.

The information processing system 1 includes an information processing device 10 and a plurality of nodes 12.

The information processing device 10 and the nodes 12 are connected via a network NW. In the example illustrated in FIG. 1, the information processing system 1 includes a plurality of subnetworks (subnetworks NW1 and NW2) constituting the network NW. Each subnetwork has nodes 12 connected thereto. Moreover, each subnetwork is connected to the information processing device 10.

Moreover, the information processing device 10 has a V2X communication module 14 and a communication module 16 connected thereto. The communication module 16 is meant for performing communication with external devices via an external network 18. The V2X communication module 14 is meant for performing direct wireless communication with other vehicles 2 without involving any communication infrastructure. The direct wireless communication is performed using, for example, vehicle-to-everything (V2X) communication. Meanwhile, the V2X communication is sometimes also referred to as car-to-X (C2X) communication.

In FIG. 1 is illustrated an example in which the information processing device 10 is configured as a GW. In the first embodiment, the information processing device 10 implements the original functions of a gateway as well as performs various operations explained below. Examples of the original functions of a gateway include relay and filtering of communication among the subnetworks (for example, the subnetworks NW1 and NW2) in the information processing system 1; relay and filtering of communication between the information processing system 1 and the external network 18 on the outside of the vehicle; and relay and filtering of direct communication with other vehicles 2.

Each node 12 is an electronic device that communicates communication data with the other nodes 12 via the information processing device 10. Examples of the nodes 12 include electronic control units (ECUs), various sensors, and actuators. An ECU is an electronic device for performing a variety of control in the vehicle 2.

Meanwhile, there is no restriction on the communication standard implemented in the information processing system 1. Examples of the communication standard of the information processing system 1 include the controller area network (CAN) and FlexRay (registered trademark).

Figure 2:
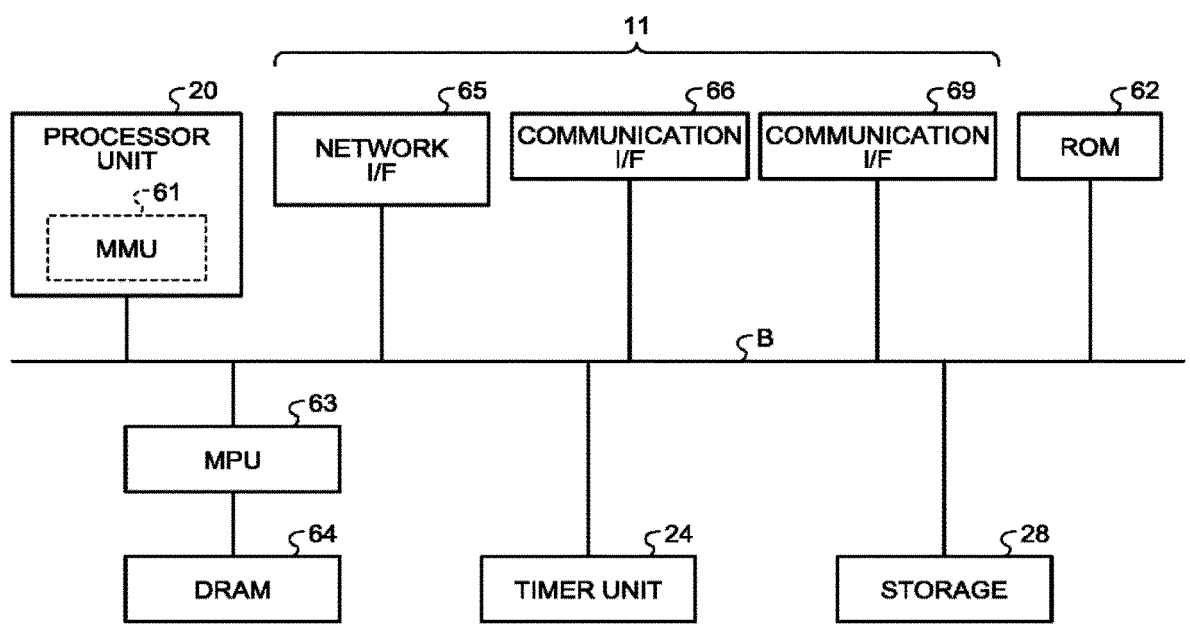
FIG. 2 is a block diagram illustrating an exemplary hardware configuration.

FIG. 2 is a block diagram illustrating an exemplary hardware configuration of the information processing device 10. The information processing device 10 includes a processor unit 20, a read only memory (ROM) 62, a memory protection unit (MPU) 63, a dynamic random access memory (DRAM) 64, a network interface (I/F) 65, a communication I/F 66, a communication I/F 69, a storage 28, and a timer unit 24 that are connected to each other by a bus B.

The processor unit 20 has a built-in computer system in the form of an integrated circuit, and performs a variety of control according to computer programs (software) running in the computer system. Examples of the processor unit 20 include a central processing unit (CPU) and a microprocessor.

The processor unit 20 includes a memory management unit (MMU) 61, which processes the memory accesses requested by the CPU. The ROM 62 is used to store a variety of data. Moreover, the ROM 62 is used to store various computer programs meant for implementing the operations of the information processing device 10. The MPU 63 performs access control with respect to the DRAM 64 according to the state of the processor unit 20.

The network I/F 65 is a communication interface meant for performing communication with the nodes 12 via the subnetworks. The communication I/F 66 is a communication interface meant for performing direct wireless communication. The communication I/F 69 is a communication interface for performing communication with external devices via the external network 18. Meanwhile, in the case of explaining the network I/F 65, the communication I/F 66, and the communication I/F 69 without distinguishing therebetween; they are sometimes collectively referred to as a communicating unit 11. The storage 28 is a memory for storing a variety of information. The timer unit 24 is a device for measuring time.

In the information processing device 10, the processor unit 20 reads a computer program from the ROM 62 and executes it, so that various functions (described later) get implemented.

Figure 3:
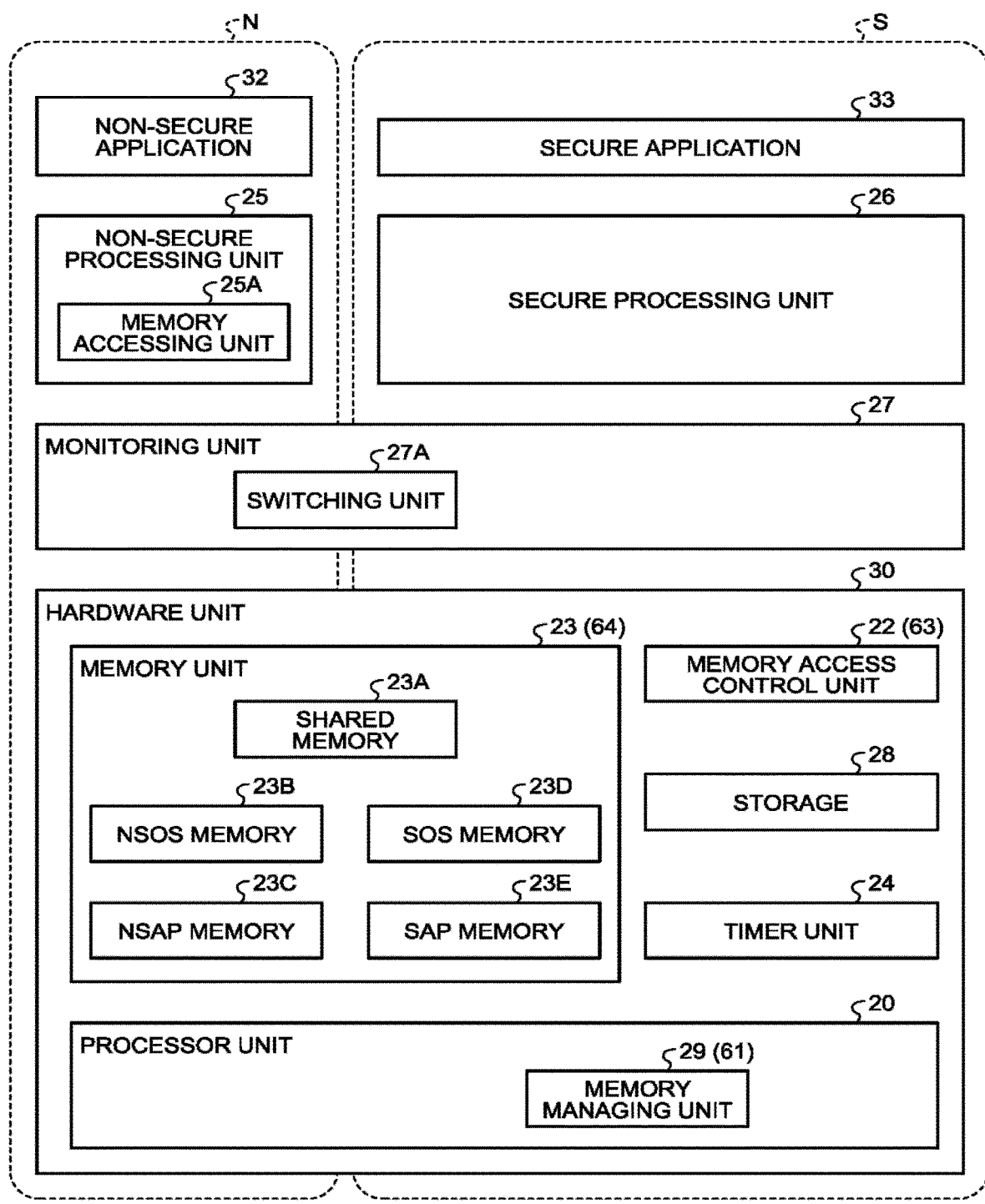
FIG. 3 is a schematic diagram illustrating a hardware configuration and a software configuration.

FIG. 3 is a schematic diagram illustrating an exemplary hardware configuration and an exemplary software configuration of the information processing device 10 according to the first embodiment.

The information processing device 10 includes a hardware unit 30, a monitoring unit 27, a non-secure processing unit 25, a secure processing unit 26, a non-secure application 32, and a secure application 33.

The hardware unit 30 includes the processor unit 20, a memory unit 23, a memory access control unit 22, the storage 28, and the timer unit 24.

In the first embodiment, the processor unit 20 has the function of executing a plurality of operating systems (OSs). An OS represents a computer program that manages various devices and makes various devices available to application programs (in the following explanation, sometimes simply referred to as "applications").

In the first embodiment, the processor unit 20 can execute computer programs separately in two modes, namely, a secure mode S and a non-secure mode NS. That is, the processor unit 20 can run mutually different OSs and applications in the secure mode S and the non-secure mode NS.

The secure mode S is meant for running an OS and applications having the vulnerability risk minimized. The non-secure mode NS is meant for running an OS and applications having a lower level of security as compared to the secure mode S.

The processor unit 20 includes a memory managing unit 29, which is implemented using the MMU 61 mentioned earlier.

The memory unit 23 is used to store a variety of data. Examples of the memory unit 23 include the DRAM 64 (see FIG. 2). The memory unit 23 has a plurality of memory areas formed therein. More particularly, the memory unit 23 includes a shared memory 23A, a non-secure OS (NSOS) memory 23B, a non-secure application (NSAP) memory 23C, a secure OS (SOS) memory 23D, and a secure application (SAP) memory 23E.

The shared memory 23A is a memory area used in common in the secure mode S and the non-secure mode NS. More particularly, the shared memory 23A is a memory area used in common by the OS and the applications running in the secure mode S and by the OS and the applications running in the non-secure mode NS.

The NSOS memory 23B is a memory area used by the non-secure processing unit 25 during the processing. The NSAP memory 23C is a memory area used by the non-secure application 32 during the processing. The SOS memory 23D is a memory area used by the secure processing unit 26 during the processing. The SAP memory 23E is a memory area used by the secure application 33 during the processing.

The memory access control unit 22 controls the accesses to the memory unit 23. The memory access control unit 22 is implemented using the MPU 63 (see FIG. 2). Regarding the details of the memory access control unit 22, the explanation is given later.

The monitoring unit 27 switches the mode between the non-secure mode NS and the secure mode S.

The monitoring unit 27 includes a switching unit 27A. When a switching instruction is received, the switching unit 27A either switches the mode from the non-secure mode NS to the secure mode S or switches the mode from the secure mode S to the non-secure mode NS. A switching instruction is sometimes referred to as a secure monitor call (SMC).

For example, when a first-type switching instruction is received for switching the mode from the non-secure mode NS to the secure mode S, the switching unit 27A switches the mode from the non-secure mode NS to the secure mode S. The first-type switching instruction is an example of a switching instruction. Moreover, when a second-type switching instruction is received for switching the mode from the secure mode S to the non-secure mode NS, the switching unit 27A switches the mode from the secure mode S to the non-secure mode NS. The second-type switching instruction is an example of a switching instruction.

The non-secure application 32 is an application running in the non-secure mode NS. That is, the non-secure application 32 has a lower level of security as compared to the applications running in the secure mode S. For example, the non-secure application 32 performs routing of communication data. In the first embodiment, routing implies performing a variety of processing on the received communication data according to the communication source or the communication destination, and deciding on the communication destination.

The non-secure processing unit 25 is an OS running in the non-secure mode NS.

In the first embodiment, the non-secure processing unit 25 runs in the non-secure mode NS, and reads communication data from and writes communication data in the shared memory 23A. Herein, a memory accessing unit 25A reads communication data from and writes communication data in the shared memory 23A via the memory access control unit 22.

At that time, the non-secure processing unit 25 uses a non-secure page table for reading communication data from and writing communication data in the shared memory 23A.

FIG. 4 is a schematic diagram illustrating exemplary data structures of a non-secure page table 34, a secure page table 35, and a memory access control table 36. Regarding the details of the secure page table 35 and the memory access control table 36, the explanation is given later.

The non-secure page table 34 is a page table referred to by the non-secure processing unit 25. The non-secure page table 34 is used to store the mapping of virtual addresses and physical addresses. The virtual addresses stored in the non-secure page table 34 represent the addresses in a virtual address space used in the non-secure processing unit 25. The physical addresses represent the addresses in the shared memory 23A.

For example, the memory accessing unit 25A reads, from the shared memory 23A, the communication data stored at the physical addresses corresponding to the virtual addresses targeted for reading in the non-secure page table 34.

Returning to the explanation with reference to FIG. 3, the non-secure processing unit 25 issues a first-type switching instruction to the monitoring unit 27. For example, when communication data is written in the shared memory 23A, the non-secure processing unit 25 issues a first-type switching instruction to the monitoring unit 27 for switching the mode from the non-secure mode NS to the secure mode S.

The secure application 33 is an application running in the secure mode S. That is, the secure application 33 has a higher level of security as compared to the applications running in the non-secure mode NS. The secure application 33 performs logging. In the first embodiment, logging implies writing communication data in the storage 28.

The secure processing unit 26 is an OS running in the secure mode S.

The secure processing unit 26 reads communication data from the shared memory 23A and writes it in the storage 28. The secure processing unit 26 refers to the secure page table 35 for reading communication data from and writing communication data in the shared memory 23A (see FIG. 4).

As illustrated in FIG. 4, the secure page table 35 is a page table used by the secure processing unit 26. The secure page table 35 is used to store the mapping of virtual addresses and physical addresses. The virtual addresses in the secure page table 35 represent the addresses in a virtual address space used in the secure processing unit 26. The physical addresses represent the addresses in the shared memory 23A.

Returning to the explanation with reference to FIG. 3, for example, the secure processing unit 26 stores the communication data, which is stored in the shared memory 23A, in the storage 28. More specifically, when a certain number of sets of communication data are written in the shared memory 23A, the secure processing unit 26 issues a storage instruction to the secure application 33 for storing the communication data that has been written in the shared memory 23A. Upon receiving the storage instruction, the secure application 33 performs logging in which the communication data stored in the shared memory 23A gets stored in the storage 28.

Moreover, the secure processing unit 26 issues a second-type switching instruction to the monitoring unit 27. For example, when the communication data written in the shared memory 23A is stored in the storage 28, the secure processing unit 26 updates state information corresponding to the physical addresses, at which the communication data is stored in the storage 28, to an unlocked state. Subsequently, the secure processing unit 26 issues a second-type switching instruction to the monitoring unit 27 for switching the mode from the secure mode S to the non-secure mode NS.

Given below is the explanation of the memory access control unit 22. The memory access control unit 22 manages, based on the memory access control table 36, the accesses from the non-secure processing unit 25 and the secure processing unit 26.

In the first embodiment, the memory access control unit 22 manages the accesses to the shared memory 23A from the non-secure application 32 and the non-secure processing unit 25 running in the non-secure mode NS and from the secure application 33 and the secure processing unit 26 running in the secure mode S.

As illustrated in FIG. 4, the memory access control table 36 is a table in which the physical addresses and the state information are held in a corresponding manner. Meanwhile, the data format of the memory access control table 36 is not limited to a table. In the first embodiment, the explanation is given for an example in which the memory access control table 36 is used to store the physical addresses, the sizes, and the state information in a corresponding manner.

As explained earlier, a physical address represents an address in the shared memory 23A. A size represents the size of a set of communication data stored in the shared memory 23A with the corresponding physical address serving as the start position.

The state information indicates the state of accessibility or no accessibility to the communication data that is stored at the corresponding physical address and that has the corresponding size. In the first embodiment, the state information indicates a locked state or an unlocked state. In the locked state, the non-secure processing unit 25 is not allowed to perform writing but is allowed to perform reading. In the unlocked state, the non-secure processing unit 25 is allowed to perform writing as well as reading.

Hence, in the shared memory 23A, with respect to the area of physical addresses having the state information set to the "locked state", the non-secure processing unit 25 can read the communication data but cannot write the communication data. On the other hand, in the shared memory 23A, with respect to the area of physical addresses having the state information set to the "unlocked state", the non-secure processing unit 25 can read as well as write the communication data.

Meanwhile, the secure processing unit 26 can perform reading and writing with respect to all physical addresses in the shared memory 23A regardless of the state information.

For example, the memory access control unit 22 receives a write request with respect to the shared memory 23A from the non-secure application 32 or the non-secure processing unit 25 running in the non-secure mode NS. Then, the memory access control unit 22 refers to the memory access control table 36, and identifies the state information corresponding to the area defined by the physical addresses and the sizes specified in the write request.

When the identified state information indicates the "locked state", the memory access control unit 22 notifies the non-secure application 32 or the non-secure processing unit 25, which has issued the write request, about error information indicating a write error. On the other hand, when the identified state information indicates the "unlocked state", the memory access control unit 22 allows the writing. As a result, the non-secure application 32 or the non-secure processing unit 25 writes the target communication data for writing in the shared memory 23A.

Meanwhile, when a read request is received front the non-secure application 32 or the non-secure processing unit 25 running in the non-secure mode NS, the memory access control unit 22 allows reading even if the identified state information indicates the "locked state". Moreover, when a read request or a write request is received from the secure application 33 or the secure processing unit 26 running in the secure mode S, the memory access control unit 22 allows reading or writing regardless of the type of the identified state information.

Meanwhile, the memory access control table 36 is updated by the monitoring unit 27 or the secure processing unit 26.

For example, when a first-type switching instruction for switching the mode to the secure mode S is received, the monitoring unit 27 switches the mode from the non-secure mode NS to the secure mode S. Then, the monitoring unit 27 updates, to the "locked state", such state information in the memory access control table 36 which corresponds to the physical addresses in the shared memory 23A at which the communication data is written. For example, the monitoring unit 27 can update the state information by reading the information specified in the first-type switching instruction and identifying the physical addresses in the shared memory 23A at which the communication data was written during the immediately previous instance of processing. Furthermore, the non-secure processing unit 25 can write, in the shared memory 23A, the information enabling identification of the physical addresses of the communication data written during the immediately previous instance of processing. In that case, the monitoring unit 27 can update the state information by reading the information from the shared memory 23A and identifying the physical addresses in the shared memory 23A at which the communication data was written during the immediately previous instance of processing.

Moreover, for example, when the communication data written in the shared memory 23A is stored in the storage 28; the secure processing unit 26 updates, to the "unlocked state", such state information in the memory access control table 36 which correspond to the physical addresses of the concerned communication data. Subsequently, the secure processing unit 26 issues a second-type switching instruction to the monitoring unit 27 for switching the mode from the secure mode S to the non-secure mode NS.

Figure 5:
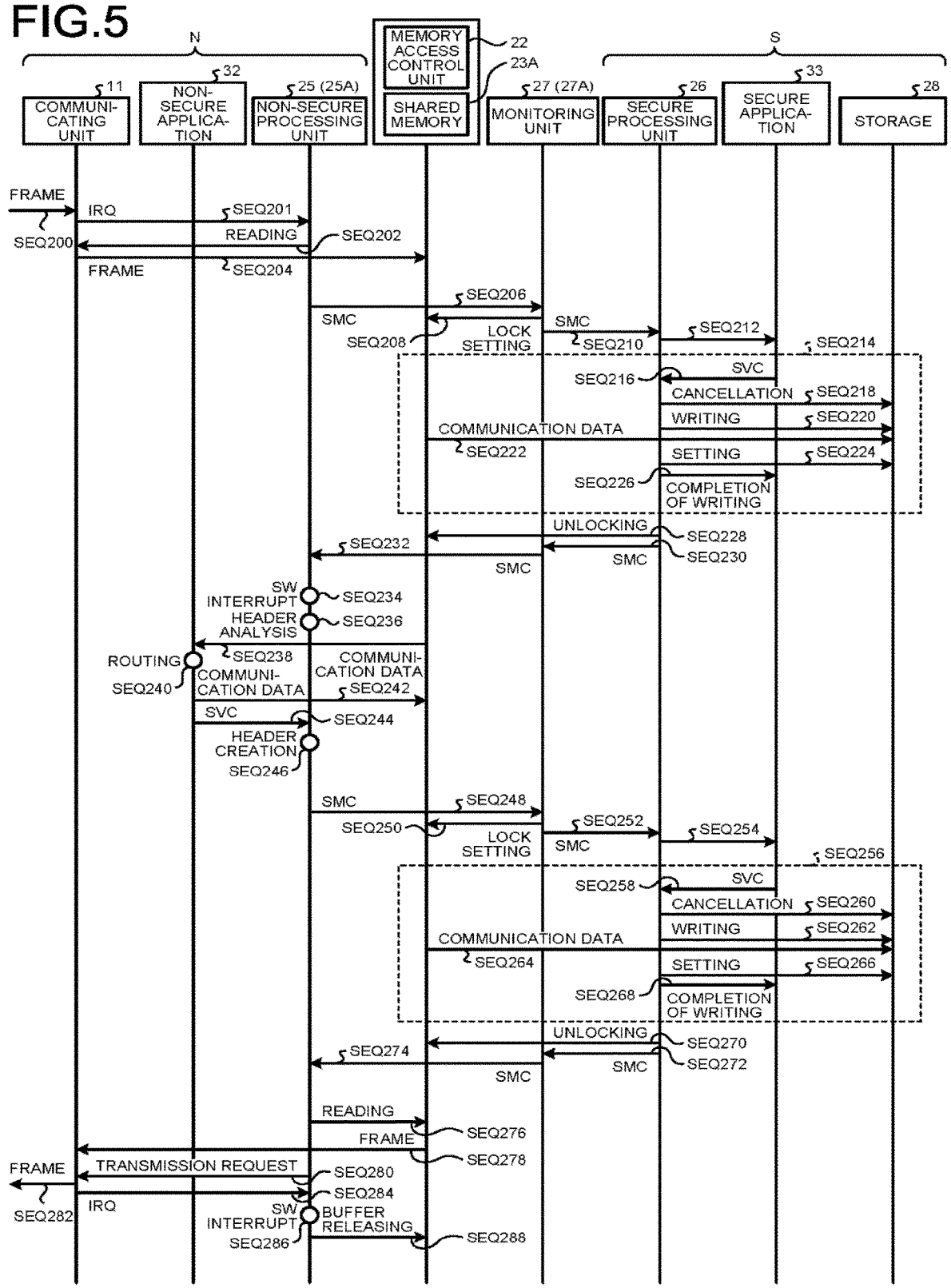
FIG. 5 is a sequence diagram illustrating a communication operation.

Given below is the explanation of an exemplary flow of a communication operation performed in the information processing device 10 according to the first embodiment. FIG. 5 is a sequence diagram illustrating an exemplary flow of a communication operation performed in the information processing device 10 according to the first embodiment.

Meanwhile, in the initial state, it is assumed that all sets of state information in the memory access control table 36 indicate the "unlocked state".

For example, at the time of activation of the information processing device 10, the secure processing unit 26 or the monitoring unit 27 updates all sets of state information in the memory access control table 36 to indicate the "unlocked state". Meanwhile, the time of activation implies the time when the power supply is started to the components of the information processing device 10. For example, the time of activation implies the time when the accessory power supply of the vehicle 2 is switched ON or the time when the ignition power supply of the vehicle 2 is switched ON.

Then, assume that the communicating unit 11 receives frames including communication data (SEQ200). As described earlier, the communicating unit 11 represents at least one of the network I/F 65, the communication I/F 66, and the communication I/F 69 (see FIG. 2). The communicating unit 11 stores the received frames in a communication memory used in the communicating unit 11. Upon receiving the frames, the communicating unit 11 issues a processing request indicating reception (IRQ: Interrupt ReQuest) to the non-secure processing unit 25 (SEQ201).

The non-secure processing unit 25 reads the addresses and the sizes of the frames stored in the communication memory (SEQ202) and moves the frames from the communication memory to the shared memory 23A (SEQ204).

That is, the non-secure processing unit 25 moves the frames, which are stored in the communication memory, directly to the shared memory 23A without copying them to the NSOS memory 23B of itself.

Alternatively, the non-secure processing unit 25 can move only the communication data, which is included in the frames, to the shared memory 23A.

Meanwhile, at SEQ204, the memory accessing unit 25A identifies, from the non-secure page table 34, the target physical addresses for writing the communication frames that are received from the non-secure processing unit 25. As described earlier, in the initial state, all sets of state information in the memory access control table 36 indicate the "unlocked state". Thus, since the state information that is specified in the memory access control table 36 and that corresponds to the identified physical addresses indicates the "unlocked state", the memory access control unit 22 allows writing. Hence, the non-secure processing unit 25 moves the frames from the communication memory to the shared memory 23A.

Subsequently, the non-secure processing unit 25 issues a first-type switching instruction (SMC: secure monitor call) to the monitoring unit 27 for switching the mode to the secure mode S (SEQ206). Upon receiving the first-type switching instruction, the monitoring unit 27 switches the mode from the non-secure mode NS to the secure mode S.

Then, the monitoring unit 27 updates, to the "locked state" such state information in the memory access control table 36 which corresponds to the physical addresses in the shared memory 23A at which the frames (including communication data) were written at SEQ204 (SEQ208). As a result of this operation, in the shared memory 23A, the area corresponding to the concerned physical addresses is set to the locked state and is restricted from being subjected to writing by the non-secure application 32 or the non-secure processing unit 25 running in the non-secure mode NS.

Subsequently, the monitoring unit 27 sends, to the secure processing unit 26, a message (for example, an SMC) indicating that the mode has been switched to the secure mode S (SEQ210).

When it is determined that a certain number of sets of communication data is written in the shared memory 23A, the secure processing unit 26 issues a storage instruction to the secure application 33 for storing the communication data that has been stored in the shared memory 23A (SEQ212).

Then, the secure application 33 and the secure processing unit 26 perform logging in which the communication data stored in the shared memory 23A is written in the storage 28 (SEQ214). In the first embodiment, the secure application 33 and the secure processing unit 26 perform writing using the secure write protection function. Meanwhile, the secure write protection function is defined as an optional function of the eMMC Version 5.1 and UFS (Universal Flash Storage) Version 2.1.

More specifically, the secure application 33 sends, to the secure processing unit 26, a supervisor call (SVC) indicating writing of communication data in the storage 28 and the size of the communication data to be written (SEQ216). The secure processing unit 26 uses a storage key and cancels the writing restriction with respect to such an area in the storage 28 which is indicated by the physical addresses for writing the communication data of the received size and indicated by the data size (SEQ218). As a result of this operation, it becomes possible to perform writing in the concerned area in the storage 28.

Then, in the area in the storage 28 for which the writing restriction is canceled as a result of the operation performed at SEQ218, the secure processing unit 26 writes the communication data that was stored in the shared memory 23A as a result of the immediately previous operation (the operation at SEQ204) (SEQ220 and SEQ222).

Subsequently, the secure processing unit 26 uses a storage key and sets a writing restriction with respect to the area in the storage 28 in which the communication data is written (SEQ224). Then, the secure processing unit 26 notifies the secure application 33 about the completion of writing (SEQ226).

Once the logging is over, the secure processing unit 26 updates, to the unlocked state, such state information in the memory access control table 36 which corresponds to the physical addresses of the communication data that was written in the storage 28 from the shared memory 23A as a result of the immediately previous logging (i.e., the operation at SEQ214) (SEQ228).

Then, the secure processing unit 26 issues a second-type switching instruction to the monitoring unit 27 for switching the mode to the non-secure mode NS (SEQ230).

Upon receiving the second-type switching instruction, the monitoring unit 27 switches the mode from the secure mode S to the non-secure mode NS. Then, the monitoring unit 27 sends, to the non-secure processing unit 25, a message (for example, an SMC) indicating that the mode has been changed to the non-secure mode NS (SEQ232).

When the frames are moved from the communication memory to the shared memory 23A, the non-secure processing unit 25 determines that communication frames are received (an SW interrupt) (SEQ234), and analyses the headers of the frames received at SEQ204 (SEQ236). Herein, the operation at SEQ234 can be alternatively performed at a timing earlier than the logging (SEQ214).

Subsequently, the non-secure processing unit 25 reads, from the shared memory 23A, the frames moved to the shared memory 23A at SEQ204 and moves the read frames to the NSAP memory 23C of the non-secure application 32 (SEQ238).

That is, the non-secure processing unit 25 moves the frames directly from the shared memory 23A to the NSAP memory 23C and not from the NSOS memory 23B of the non-secure processing unit 25.

Then, the non-secure application 32 performs routing of the frames that were moved to the NSAP memory 23C as a result of the operation at SEQ238 (SEQ240). For example, the non-secure application 32 performs routing and changes the communication data included in the frames. Alternatively, the non-secure application 32 may not change the communication data.

Subsequently, the non-secure application 32 moves the frames, which include the changed communication data, from the NSAP memory 23C to the shared memory 23A (SEQ242). At that time, the non-secure application 32 writes the frames, which include the changed communication data, at new physical addresses in the shared memory 23A.

Then, the non-secure application 32 requests the non-secure processing unit 25 to send the frames (for example, sends an SVC) (SEQ244).

That is, the frames including the changed communication data are moved from the NSAP memory 23C directly to the shared memory 23A and not to the NSOS memory 23B.

The non-secure processing unit 25 creates the headers of the communication frames (SEQ246). Then, the non-secure processing unit 25 issues a first-type switching instruction (SMC: secure monitor call) to the monitoring unit 27 for switching the mode to the secure mode S (SEQ248). Upon receiving the first-type switching instruction, the monitoring unit 27 switches the mode from the non-secure mode NS to the secure mode S.

Then, the monitoring unit 27 updates, to the locked state, such state information in the memory access control table 36 which corresponds to the physical addresses in the shared memory 23A at which the frames including new communication data are written (SEQ250). As a result of this operation, the area corresponding to the concerned physical addresses in the shared memory 23A is set to the "locked state" and is restricted from being subjected to writing by the non-secure application 32 or the non-secure processing unit 25 running in the non-secure mode NS.

Subsequently, the monitoring unit 27 sends, to the secure processing unit 26, a message (for example, an SMC) indicating that the mode has been switched to the secure mode S (SEQ252).

When it is determined that a certain number of sets of communication data has been written, the secure processing unit 26 issues a storage instruction to the secure application 33 for storing the communication data that has been stored in the shared memory 23A (SEQ254).

Upon receiving the storage instruction, the secure application 33 performs logging in which the communication data stored in the shared memory 23A is written in the storage 28 (SEQ256). The secure application 33 performs logging in an identical manner to the operations from SEQ214 explained earlier (SEQ256 (SEQ258 to SEQ268)).

Once the logging is over, the secure processing unit 26 updates, to the unlocked state, such state information in the memory access control table 36 which corresponds to the physical addresses of the communication data that was written in the storage 28 from the shared memory 23A as a result of the logging performed at SEQ256 (SEQ270).

Then, the secure processing unit 26 issues a second-type switching instruction to the monitoring unit 27 for switching the mode to the non-secure mode NS (SEQ272).

Upon receiving the second-type switching instruction, the monitoring unit 27 switches the mode from the secure mode S to the non-secure mode NS. Then, the monitoring unit 27 sends, to the non-secure processing unit 25, a message (for example, an SMC) indicating that the mode has been switched to the non-secure mode NS (SEQ274).

When a request for sending the frames is issued, the non-secure processing unit 25 reads the frames stored in the shared memory 23A (SEQ276) and copies the frames in the communication memory of the communicating unit 11 (SEQ278). Then, the non-secure processing unit 25 requests the communicating unit 11 to send the frames (SEQ280). Alternatively, the request for sending the frames can be issued before the logging is performed (SEQ256).

The communicating unit 11 sends the communication frames (SEQ282) and, when the transmission is completed, sends an interrupt request signal (IRQ) indicating the completion of the transmission to the non-secure processing unit 25 (SEQ284).

Thus, the non-secure processing unit 25 determines that the transmission is completed (an SW interrupt) (SEQ286) and releases the shared memory 23A (SEQ288). It marks the end of the present routine.

Meanwhile, at the time of activation of the information processing device 10, the non-secure processing unit 25 and the secure processing unit 26 can load the addresses of the shared memory 23A in the memory unit 23 and perform the operations explained above.

Moreover, at the time of deactivation of the information processing device 10, it is desirable that the secure processing unit 26 writes the communication data, which is stored in the shared memory 23A, in the storage 28. Herein, the time of deactivation implies the time of issuing an instruction to switch OFF the power supply to the components of the information processing device 10. For example, the time of deactivation implies the time when an instruction to switch OFF the ignition power supply of the vehicle 2 or to switch OFF the ignition power supply of the vehicle 2 is issued due to a user operation of the ignition switch of the vehicle 2. After the communication data in the shared memory 23A is written in the storage 28, the information processing device 10 can end the operations.

As a result of the communication operation performed in the information processing device 10, it becomes possible to reduce the memory size.

Figure 6:
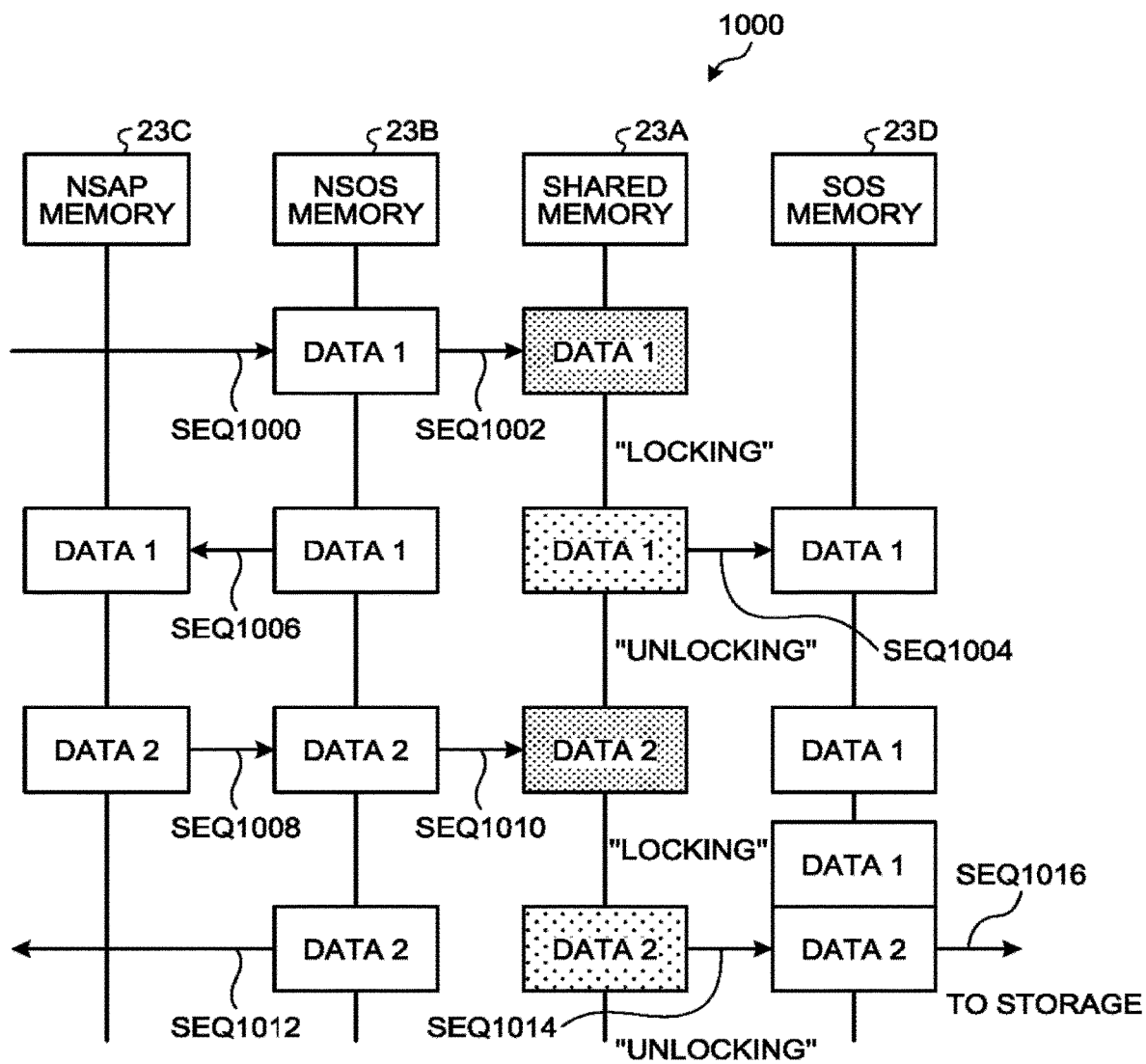
FIG. 6 is a schematic diagram illustrating a flow of the data in a conventional configuration.
Figure 7:
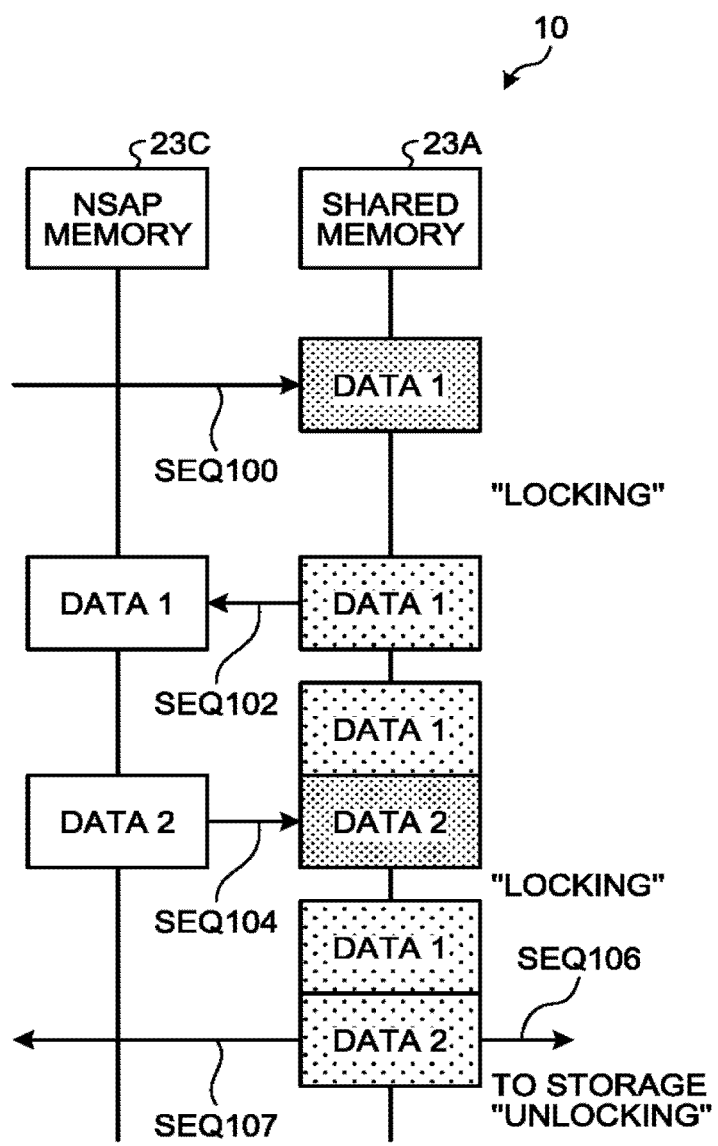
FIG. 7 is a schematic diagram illustrating a flow of the data.

FIGS. 6 and 7 are explanatory diagrams for explaining the reduction in the memory size.

FIG. 6 is a schematic diagram illustrating an exemplary flow of the data that gets stored in the memory unit 23 in an information processing device according to a comparison example (hereinafter, referred to as a comparison-purpose information processing device 1000).

For example, assume that data 1 is received as communication data from the nodes 12 via the subnetworks NW. Then, the comparison-purpose information processing device 1000 stores the data 1 in the NSOS memory 23B (SEQ1000). Subsequently, the comparison-purpose information processing device 1000 copies the data 1 from the NSOS memory 23B to the shared memory 23A (SEQ1002). Regarding writing and reading by the components running in the non-secure mode NS, the comparison-purpose information processing device 1000 sets the area of storing the data 1 in the shared memory 23A to the locked state. Then, the comparison-purpose information processing device 1000 moves the data 1 from the shared memory 23A to the SOS memory 23D and the SAP memory 23E (SEQ1004).

Moreover, the comparison-purpose information processing device 1000 moves the data 1 stored in the NSOS memory 23B to the NSAP memory 23C (SEQ1006). Then, the comparison-purpose information processing device 1000 performs routing to change the data 1 and obtain data 2, and moves the data 2 to the NSOS memory 23B (SEQ1008).

Furthermore, the comparison-purpose information processing device 1000 copies the data 2 from the NSOS memory 23B to the shared memory 23A (SEQ1010). Regarding writing and reading by the components running in the non-secure mode NS, the comparison-purpose information processing device 1000 sets the area of storing the data 2 in the shared memory 23A to the locked state. Then, the comparison-purpose information processing device 1000 moves the data 2 from the shared memory 23A to the SOS memory 23D and the SAP memory 23E (SEQ1014). Subsequently, the comparison-purpose information processing device 1000 stores the data 1 and the data 2 in the storage 28 (SEQ1016).

Furthermore, the comparison-purpose information processing device 1000 sends the data 2, which is stored in the NSOS memory 23B, to the nodes 12 (SEQ1012).

As illustrated in FIG. 6, conventionally, in the case of performing routing and logging, it becomes necessary to redundantly store the same communication data in the NSAP memory 23C, the NSOS memory 23B, the shared memory 23A, the SOS memory 23D, and the SAP memory 23E. More particularly, if m represents the number of sets of communication data to be processed within a specified period of time (where m is an integer equal to or greater than 1), the comparison-purpose information processing device 1000 needs to have the memory size equal to "2m+3" times of the frame size.

More specifically, as illustrated in FIG. 6, in the NSAP memory 23C, the memory area to be used in transmission and reception of communication data has the same size as the frame size. Moreover, in the NSOS memory 23B, the memory area to be used in routing has the same size as the frame size. Furthermore, the shared memory 23A has the same memory size as the frame size. Moreover, in the SOS memory 23D, the memory area to be used in performing writing in the storage 28 has the size equal to m times of the frame size. Furthermore, in the SAP memory 23E, the memory area to be used in performing writing in the storage 28 has the size equal to m times of the frame size. Hence, in the comparison-purpose information processing device 1000, the memory size equal to "2m+3" times of the frame size is required.

Meanwhile, in the sequence of operations including reception of communication data, routing, writing of communication data in the storage 28 (logging), and transmission of communication data; assume that n represents the number of times of receiving communication data, the number of times of sending communication data, and the number of times of performing routing (where n is an integer equal to or greater than 1). In that case, in the comparison-purpose information processing device 1000, regarding the network transmission-reception, routing, and logging; the copy count in the memory unit 23 is 2n, 6n, and 2n, respectively. Moreover, in the comparison-purpose information processing device 1000, the switching between the secure mode S and the non-secure mode NS needs to be performed for 4n number of times.

FIG. 7 is a schematic diagram illustrating an exemplary flow of the data that gets stored in the memory unit 23 in the information processing device 10 according to the first embodiment.

For example, assume that the data 1 is received as communication data from the nodes 12 via the subnetworks NW. In that case, the information processing device 10 according to the first embodiment stores the data 1 in the shared memory 23A (SEQ100). Then, the monitoring unit 27 updates, to the locked state, such state information in the memory access control table 36 which corresponds to the physical addresses in the shared memory 23A at which the data 1 is written. As a result of this operation, the area in the shared memory 23A in which the data 1 is stored is set to the "locked state" and is restricted from being subjected to writing by the non-secure application 32 or the non-secure processing unit 25 running in the non-secure mode NS. Meanwhile, as explained earlier, in the information processing device 10 according to the first embodiment, even in the "locked state", there is no restriction on reading by the non-secure application 32 and the non-secure processing unit 25.

Then, the non-secure processing unit 25 reads the data 1, which is stored in the shared memory 23A, from the shared memory 23A and moves it to the NSAP memory 23C of the non-secure application 32 (SEQ102). Subsequently, the non-secure application 32 performs routing to change the data 1 and obtain the data 2, and moves the data 2 to the shared memory 23A (SEQ104).

In response, the monitoring unit 27 sets, to the "locked state", such state information in the memory access control table 36 which corresponds to the physical addresses in the shared memory 23A at which the data 2 is written. As a result of this operation, the area in the shared memory 23A in which the data 2 is stored is set to the "locked state".

Then, the secure processing unit 26 performs logging and writes the data 1 and the data 2, which are stored in the shared memory 23A, in the storage 28 (SEQ106). Subsequently, the secure processing unit 26 updates, to the "locked state", such state information in the memory access control table 36 which corresponds to the physical addresses in the shared memory 23A at which the data 1 and the data 2 are stored. Then, the data 2 is read from the shared memory 23A and is sent to the nodes 12 via the subnetworks NW (SEQ107).

As illustrated in FIG. 7, regarding the sets of communication data that are conventionally stored in the NSOS memory 23B, the shared memory 23A, and the SOS memory 23D; all those sets of communication data are stored in the shared memory 23A according to the first embodiment. Hence, the information processing device 10 according to the first embodiment enables achieving reduction in the memory size.

More particularly, if m represents the number of sets of communication data to be processed within a specified period of time (where m is an integer equal to or greater than 1), then the information processing device 10 according to the first embodiment can have the memory size equal to "m+1" times of the frame size. Thus, as compared to the comparison-purpose information processing device 1000, the information processing device 10 according to the first embodiment enables achieving reduction in the memory size by half or beyond.

Meanwhile, in the sequence of operations including reception of communication data, routing, writing of communication data in the storage 28 (logging), and transmission of communication data; assume that n represents the number of times of receiving communication data, the number of times of sending communication data, and the number of times of performing routing (where n is an integer equal to or greater than 1). In that case, in the information processing device 10 according to the first embodiment, regarding the network transmission-reception, routing, and logging; the copy count in the memory unit 23 is 2n, 0, and 0, respectively. Thus, the information processing device 10 according to the first embodiment enables achieving reduction in the copy count in the memory unit 23.

As explained above, the information processing device 10 according to the first embodiment includes the monitoring unit 27, the non-secure processing unit 25, the secure processing unit 26, and the memory access control unit 22. The monitoring unit 27 switches the mode between the non-secure mode NS and the secure mode S. The non-secure processing unit 25 runs in the non-secure mode NS, and writes communication data in and reads communication data from the shared memory 23A. The secure processing unit 26 runs in the secure mode S, and reads the communication data from the shared memory 23A and writes it in the storage 28. The memory access control unit 22 manages the accesses from the non-secure processing unit 25 and the secure processing unit 26 based on the memory access control table 36. In the memory access control table 36, the physical addresses in the shared memory 23A are held in a corresponding manner to the state information. Moreover, the state information indicates either the locked state in which the non-secure processing unit 25 is not allowed to perform writing or the unlocked state in which the locked state has been cancelled.

In this way, in the information processing device 10 according to the first embodiment, the non-secure processing unit 25 running in the non-secure mode NS and the secure processing unit 26 running in the secure mode S read communication data from and write communication data in the shared memory 23A based on the memory access control table 36.

That is, in the information processing device 10 according to the first embodiment, the non-secure processing unit 25 and the secure processing unit 26 perform reading and writing of the communication data using the shared memory 23A without using the respective memories managed therein (the NSOS memory 23B and the SOS memory 23D, respectively).

Thus, the information processing device 10 according to the first embodiment enables achieving reduction in the memory size.

Moreover, in the information processing device 10 according to the first embodiment, the accesses to the shared memory 23A are managed based on the memory access control table 36. Furthermore, in the information processing device 10 according to the first embodiment, the monitoring unit 27 switches the mode between the non-secure mode NS and the secure mode S. Hence, in the information processing device 10 according to the first embodiment, it becomes possible to improve the security in addition to achieving the effects described above.

First Modification Example

In the first embodiment, the explanation is given for a configuration in which the non-secure processing unit 25 writes the received communication data in the shared memory 23A and then issues a first-type switching instruction to the monitoring unit 27.

However, alternatively, when a certain number of sets of communication data are written in the shared memory 23A, the non-secure processing unit 25 can issue a first-type switching instruction to the monitoring unit 27. Herein, the certain number can be set in advance.

Figure 8:
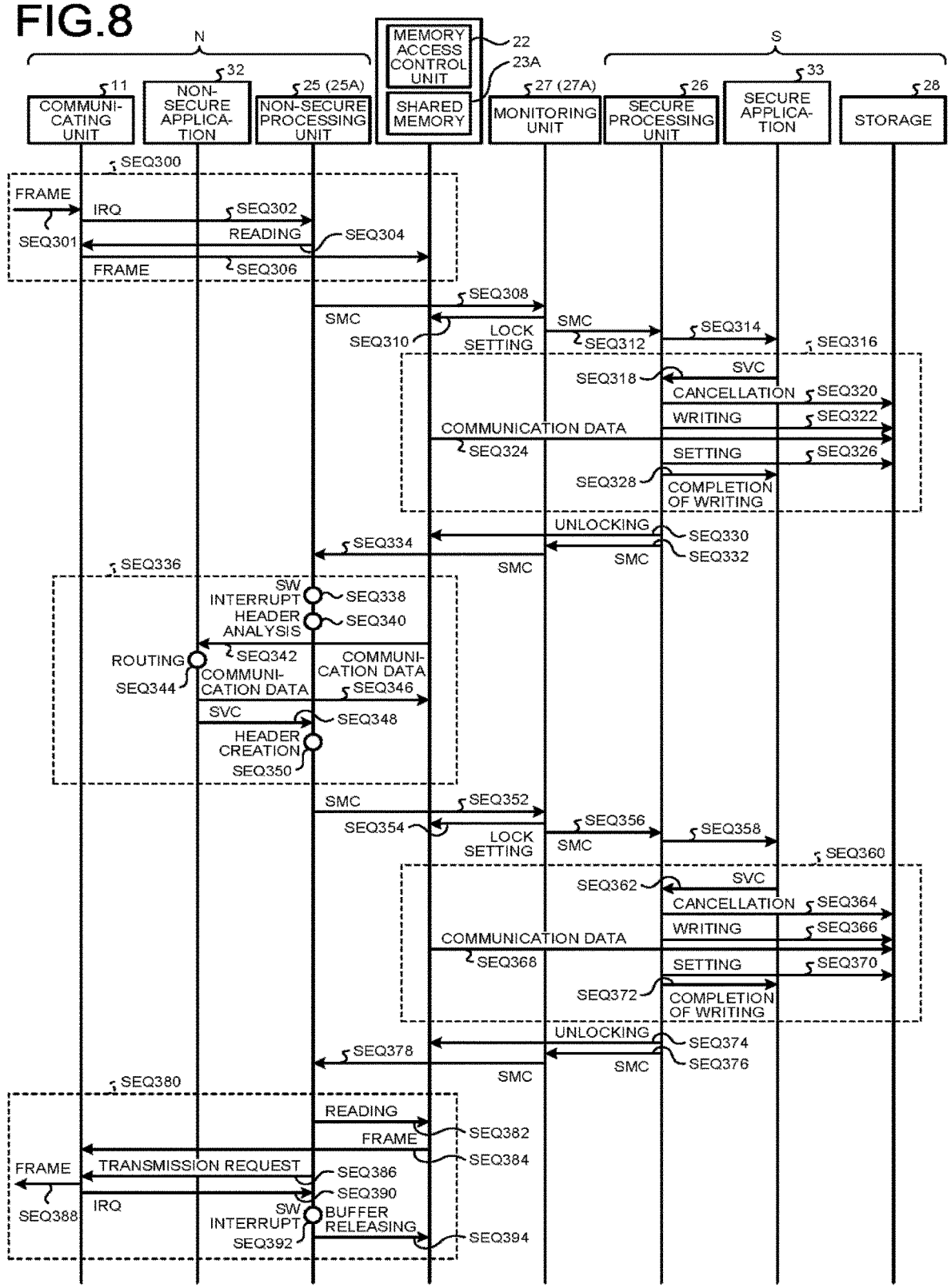
FIGS. 8 and 9 are sequence diagrams illustrating a flow of a communication operation.

FIG. 8 is a sequence diagram illustrating an exemplary flow of a communication operation performed in the information processing device 10 according to the first embodiment.

Firstly, the information processing device 10 according to the first modification example performs a reception operation of receiving communication data (SEQ300). The operation at SEQ300 includes operations from SEQ301 to SEQ306. The operation at SEQ300 (SEQ301 to SEQ306) is identical to the operations from SEQ200 to SEQ204 performed in the information processing device 10 according to the first embodiment (see FIG. 5).

When it is determined that a certain number of sets of communication data are written in the shared memory 23A, the non-secure processing unit 25 issues a first-type switching instruction (an SMC) to the monitoring unit 27 for switching the mode to the secure mode S (SEQ308). Upon receiving the first-type switching instruction, the monitoring unit 27 switches the mode from the non-secure mode NS to the secure mode S.

Then, the information processing device 10 according to the first modification example performs operations from SEQ310 to SEQ334 in an identical manner to the operations from SEQ208 to SEQ232 (see FIG. 5).

Subsequently, upon receiving an SMC as a result of the operation at SEQ334, the non-secure processing unit 25 performs operations related to routing (SEQ336). The operation at SEQ336 includes operations from SEQ338 to SEQ350. The operation at SEQ336 (SEQ338 to SEQ350) is identical to the operations from SEQ234 to SEQ246 performed in the information processing device 10 according to the first embodiment (see FIG. 5).

When it is determined as a result of the operation at SEQ336 that a certain number of sets of communication data are written in the shared memory 23A, the non-secure processing unit 25 issues a first-type switching instruction (an SMC) to the monitoring unit 27 for switching the mode to the secure mode S (SEQ352). Upon receiving the first-type switching instruction, the monitoring unit 27 switches the mode from the non-secure mode NS to the secure mode S.

Then, the information processing device 10 according to the first modification example performs operations from SEQ354 to SEQ378 in an identical manner to the operations from SEQ250 to SEQ274 according to the first embodiment (see FIG. 5).

Subsequently, the information processing device 10 according to the first modification example performs operations related to the transmission of the communication data (SEQ380). In the first modification example, regarding each set of communication data stored in the shared memory 23A, the information processing device 10 performs operations from SEQ382 to SEQ394 in an identical manner to the operations at SEQ276 to SEQ288 illustrated in FIG. 5.

As explained above, in the first modification example, when a certain number of sets of communication data are written in the shared memory 23A, the non-secure processing unit 25 issues a first-type switching instruction to the monitoring unit 27. Hence, as compared to the information processing device 10 according to the first embodiment, the information processing device 10 according to the first modification example enables achieving reduction in the number of times of switching the mode between the secure mode S and the non-secure mode NS.

That is, in addition to achieving the effects achieved using the information processing device 10 according to the first embodiment, the information processing device 10 according to the first modification example enables achieving reduction in the number of times of switching the mode between the secure mode S and the non-secure mode NS.

Second Modification Example

In the first embodiment, the explanation is given for a case in which, when a first-type switching instruction is received for switching the mode to the secure mode S, the monitoring unit 27 switches the mode from the non-secure mode NS to the secure mode S.

However, alternatively, when a first-type switching instruction is received from the timer unit 24 for switching the mode to the secure mode S, the monitoring unit 27 can switch the mode from the non-secure mode NS to the secure mode S. In that case, the timer unit 24 sends the first-type switching instruction to the monitoring unit 27 after the elapse of a predetermined period of time since the previous issuance of the first-type switching instruction. Upon receiving the first-type switching instruction from the timer unit 24, the monitoring unit 27 switches the mode from the non-secure mode NS to the secure mode S. Then, the monitoring unit 27 can update, to the "locked state", such state information in the memory access control table 36 which corresponds to the physical addresses in the shared memory 23A at which the communication data was written as a result of the operations performed in the immediately previous instance of processing.

Figure 9:
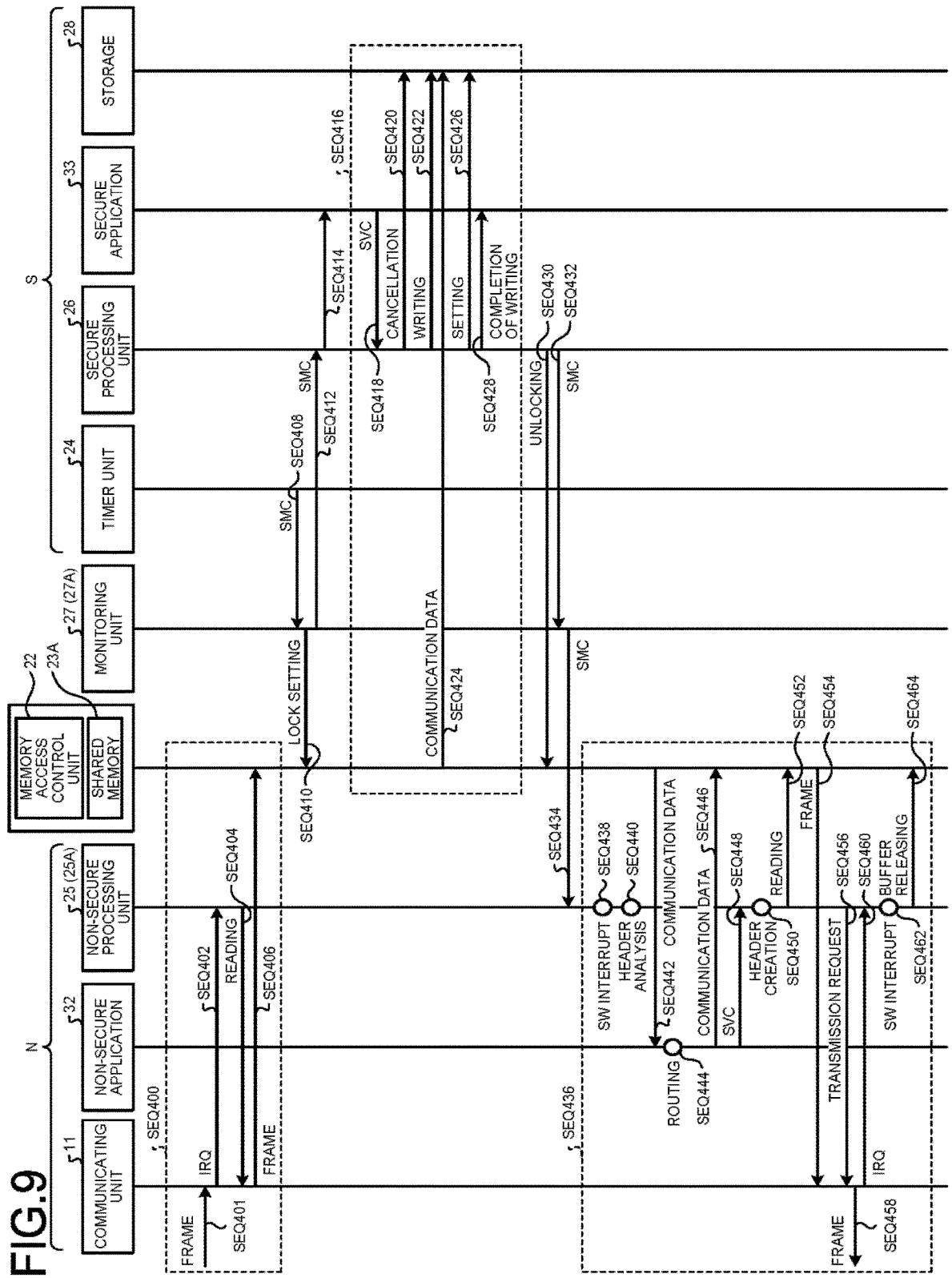

FIG. 9 is a sequence diagram illustrating an exemplary flow of a communication operation performed in the information processing device 10 according to the second modification example.

Firstly, the information processing device 10 according to the second modification example performs a reception operation of receiving the communication data (SEQ400). The operation at SEQ400 includes the operations from SEQ401 to SEQ406. The operation at SEQ400 (SEQ401 to SEQ406) is identical to the operations performed from SEQ200 to SEQ204 performed in the information processing device 10 according to the first embodiment (see FIG. 5).

When it is determined that a predetermined period of time has elapsed since the previous issuance of the first-type switching instruction, the timer unit 24 issues a first-type switching instruction (an SMC) to the monitoring unit 27 for switching the mode to the secure mode S (SEQ408). Herein, the predetermined period of time can be set in advance to, for example, the period of time required for writing of a certain number of sets of communication data in the shared memory 23A. Upon receiving the first-type switching instruction, the monitoring unit 27 switches the mode from the non-secure mode NS to the secure mode S.

Then, the information processing device 10 performs operations from SEQ410 to SEQ434 in an identical manner to the operations from SEQ208 to SEQ232 according to the first embodiment (see FIG. 5).

Subsequently, when an SMC is received as a result of the operation at SEQ434, the non-secure processing unit 25 performs operations related to routing and transmission (SEQ436). The operation at SEQ436 includes operations from SEQ438 to SEQ464.

Firstly, the non-secure processing unit 25 performs the operations from SEQ438 to SEQ450 in an identical manner to the operations from SEQ234 to SEQ246 performed in the information processing device 10 according to the first embodiment (see FIG. 5).

Then, regarding each set of communication data stored in the shared memory 23A, the information processing device 10 according to the second modification example performs operations from SEQ452 to SEQ464 in an identical manner to the operations from SEQ276 to SEQ288 illustrated in FIG. 5.

As explained above, in the second modification example, when a first-type switching instruction for switching the mode from the non-secure mode NS to the secure mode S is received from the timer unit 24, the monitoring unit 27 switches the mode from the non-secure mode NS to the secure mode S. Then, the monitoring unit 27 updates, to the "locked state", the state information in the memory access control table 36 which corresponds to the physical addresses in the shared memory 23A at which the communication data is written.

For example, the monitoring unit 27 can update the state information by reading the information included in the first-type switching instruction and identifying the physical addresses in the shared memory 23A at which the communication data was written during the immediately previous instance of processing. Furthermore, the non-secure processing unit 25 can write, in the shared memory 23A, the information enabling identification of the physical addresses of the communication data written during the immediately previous instance of processing. In that case, when a first-type switching instruction is received from the timer unit 24, the monitoring unit 27 can update the state information by reading the information from the shared memory 23A and identifying the physical addresses in the shared memory 23A at which the communication data was written during the immediately previous instance of processing.

Hence, as compared to the information processing device 10 according to the first embodiment, the information processing device 10 according to the second modification example enables achieving reduction in the number of times of switching the mode between the secure mode S and the non-secure mode NS.

Second Embodiment

In a second embodiment, the explanation is given for a case in which violation response processing is further performed.

FIG. 1 is a schematic diagram illustrating an overview of an information processing system 1A. The information processing system 1A includes an information processing device 10B in place of the information processing device 10. Apart from that, the information processing system 1A is identical to the information processing system 1. FIG. 2 is a block diagram illustrating an exemplary hardware configuration of the information processing device 10B. The information processing device 10B has an identical hardware configuration to the information processing device 10.

Figure 10:
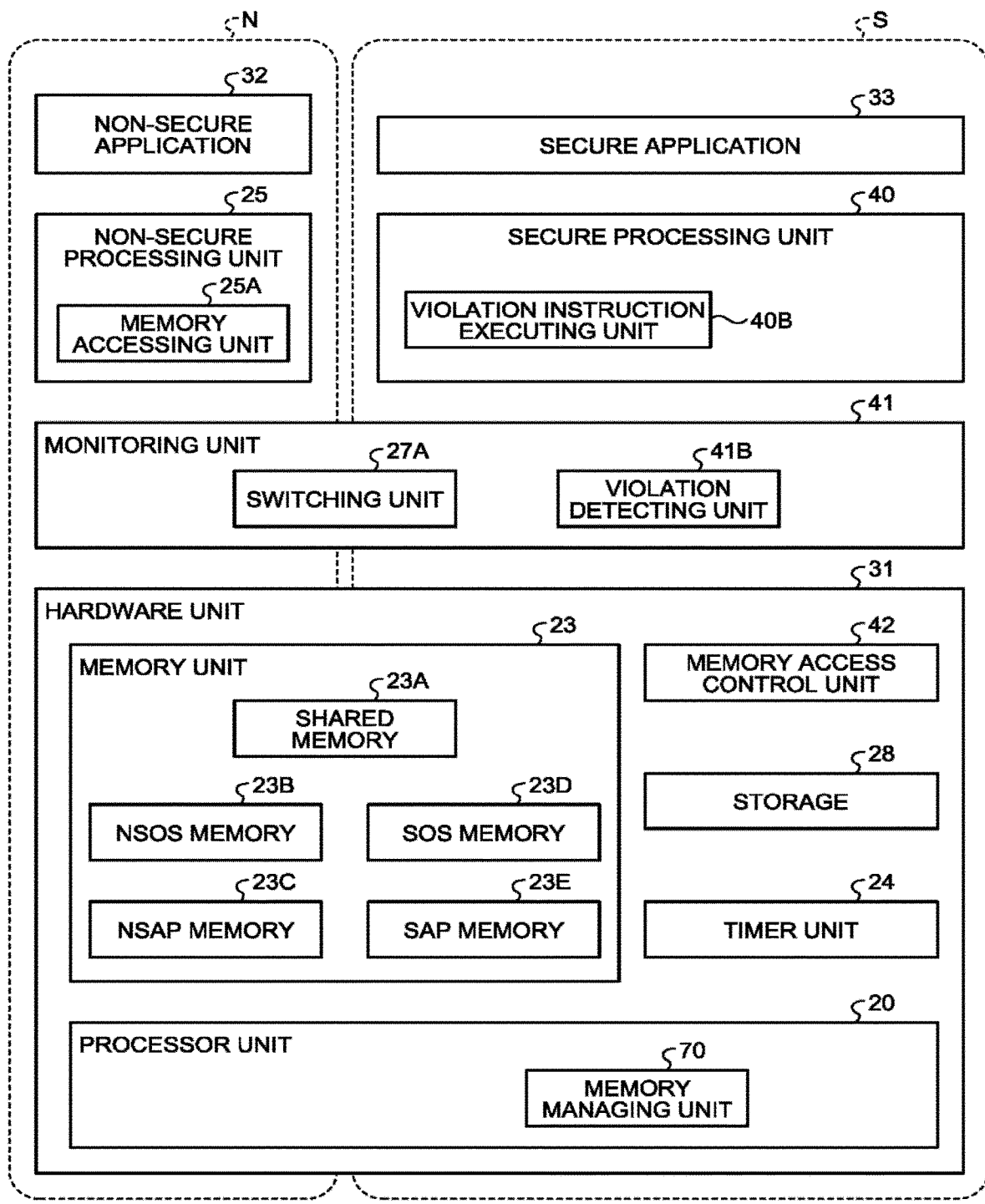
FIG. 10 is a schematic diagram illustrating a hardware configuration and a software configuration.

FIG. 10 is a schematic diagram illustrating an exemplary hardware configuration and an exemplary software configuration of the information processing device 10B according to the second embodiment.

The information processing device 10B includes a hardware unit 31, a monitoring unit 41, the non-secure processing unit 25, a secure processing unit 40, the non-secure application 32, and the secure application 33. Herein, the non-secure processing unit 25, the non-secure application 32, and the secure application 33 are identical to the first embodiment.

The hardware unit 31 includes the processor unit 20, the memory unit 23, a memory access control unit 42, the storage 28, and the timer unit 24. Except for the fact that the memory access control unit 42 is included in place of the memory access control unit 22, the hardware unit 31 is identical to the first embodiment.

The memory access control unit 42 controls the accesses to the memory unit 23 in an identical manner to the memory access control unit 22 according to the first embodiment. The memory access control unit 42 is implemented using the MPU 63 (see FIG. 2).

In an identical manner to the memory access control unit 22 according to the first embodiment, the memory access control unit 42 manages, based on the memory access control table 36, the accesses to the shared memory 23A from the non-secure application 32 and the non-secure processing unit 25 running in the non-secure mode NS and from the secure application 33 and the secure processing unit 40 running in the secure mode S.

For example, the memory access control unit 42 receives a write request with respect to the shared memory 23A from the non-secure application 32 or the non-secure processing unit 25 running in the non-secure mode NS. Then, the memory access control unit 42 refers to the memory access control table 36, and identifies the state information corresponding to the area defined by the physical addresses and the sizes specified in the write request.

In the second embodiment, when the identified state information indicates the "locked state", the memory access control unit 42 determines that there has been a writing violation by the non-secure processing unit 25. When a writing violation is determined to have occurred, the memory access control unit 42 notifies the secure processing unit 40 about violation information containing the addresses at which the writing violation is determined to have occurred and containing the target communication data for writing. More specifically, the memory access control unit 42 notifies the secure processing unit 40 about the violation information via the monitoring unit 41. The monitoring unit 41 converts the logical addresses, which are included in the violation information received from the memory access control unit 42, into physical addresses, and then notifies the secure processing unit 40 about the physical addresses.

Meanwhile, when a read request is received from the non-secure application 32 or the non-secure processing unit 25 running in the non-secure mode NS, the memory access control unit 42 allows the reading even if the identified state information indicates the "locked state". Moreover, when a read request or a write request is received from the secure application 33 or the secure processing unit 40 running in the secure mode S, the memory access control unit 42 allows the reading or the writing regardless of the type of the identified state information.

The monitoring unit 41 switches the mode between the non-secure mode NS and the secure mode S in an identical manner to the monitoring unit 27.

The monitoring unit 41 includes the switching unit 27A and a violation detecting unit 41B. The switching unit 27A is identical to the first embodiment. The violation detecting unit 41B detects the occurrence of a violation when violation information is received from the memory access control unit 42, and notifies the secure processing unit 40 about the violation information. That is, the violation detecting unit 41B converts the logical addresses, which are included in the violation information received from the memory access control unit 42, into physical addresses, and then notifies the secure processing unit 40 about the physical addresses.

The secure processing unit 40 is an OS running in the secure mode S. In the second embodiment, the secure processing unit 40 includes a violation instruction executing unit 40B. Herein, the secure processing unit 40 has the function of the violation instruction executing unit 40B in addition to having the identical functions to the first embodiment.

The violation instruction executing unit 40B performs a violation response operation when violation information is received.

In the violation response operation, according to the violation information, the communication data that is already written at the target physical addresses for writing as specified in the violation information is restricted from being read by the non-secure processing unit 25; and the target communication data for writing as specified in the violation information is written in the shared memory 23A, and the non-secure processing unit 25 is allowed to read that communication data.

Thus, in the violation response operation, the non-secure processing unit 25 is not allowed to read the already-written communication data (hereinafter, sometimes referred to as old communication data) that is already written in the physical addresses in the "locked state" at which writing of new sets of communication data (hereinafter, sometimes called new communication data) was attempted. Moreover, in the violation response operation, new communication data is written in the shared memory 23A and the non-secure processing unit 25 is allowed to read that new communication data.

In other words, in the violation response operation, old communication data is evacuated and made unreadable for the non-secure processing unit 25; and new communication data is written in the shared memory 23A and is made readable for the non-secure processing unit 25.

Figure 11:
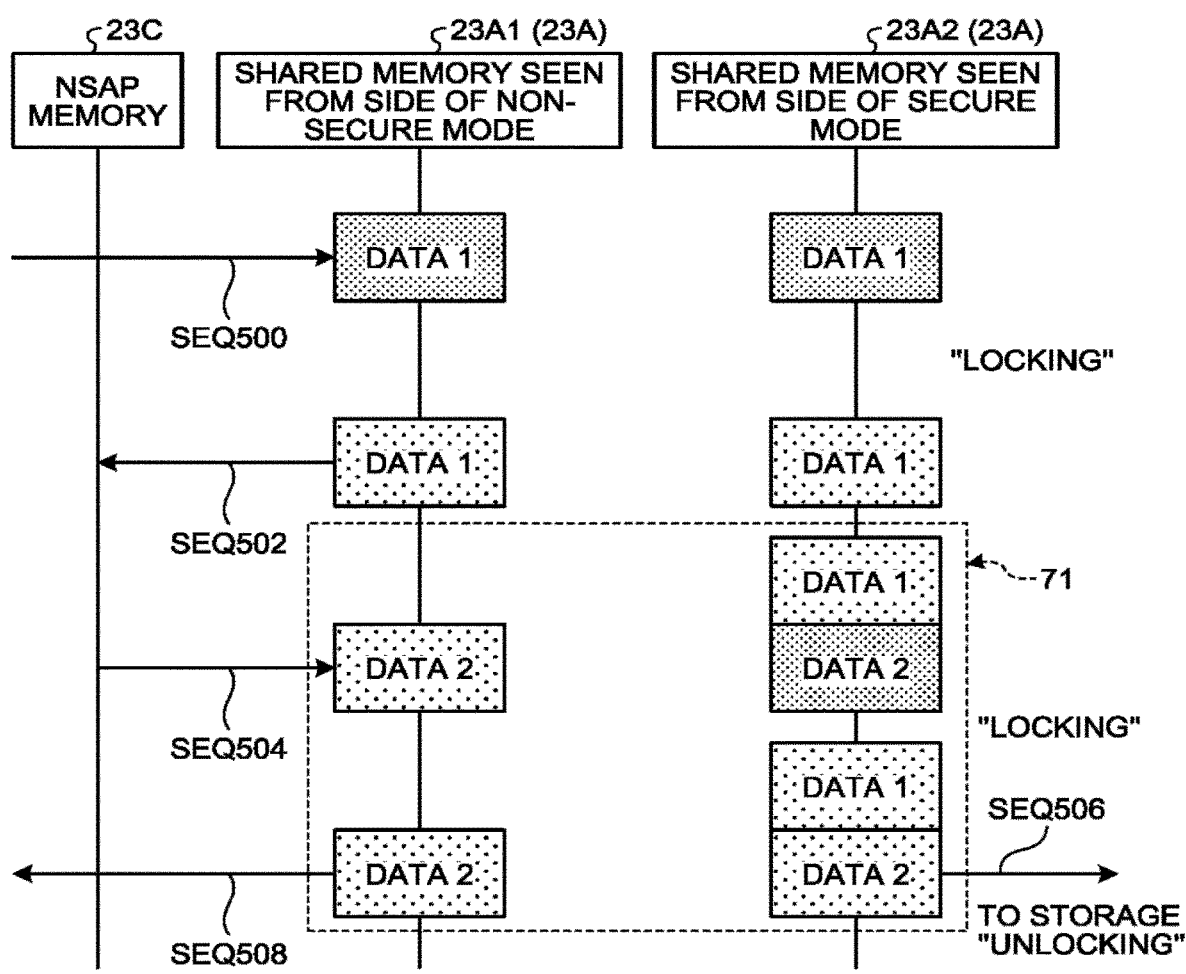
FIG. 11 is a schematic diagram illustrating a memory unit.

FIG. 11 is a schematic diagram illustrating an example of the memory unit 23 when the violation response operation according to the second embodiment is performed.

For example, assume that the data 1 is received as communication data from the nodes 12 via the subnetworks NW. In that case, in the information processing device 10B according to the second embodiment, the "data 1" representing communication data is stored in the shared memory 23A (SEQ500). In that state, the "data 1" is readable from the shared memory 23A seen from the side of the non-secure mode NS (hereinafter, sometimes referred to as a shared memory 23A1) and from the shared memory 23A seen from the side of the secure mode S (hereinafter, sometimes referred to as a shared memory 23A2).

Then, the monitoring unit 41 updates, to the locked state", such state information in the memory access control table 36 which corresponds to the physical addresses in the shared memory 23A at which the data 1 is written.

Subsequently, the non-secure processing unit 25 reads the data 1, which is stored in the shared memory 23A, from the shared memory 23A and moves it to the NSAP memory 23C of the non-secure application 32 (SEQ502). Then, the non-secure application 32 performs routing to change the data 1 and obtain the data 2, and then moves the data 2 to the shared memory 23A (SEQ504).

Herein, assume that, in the shared memory 23A, the target physical area for writing the data 2 already has the "data 1" written therein and has been set to the "locked state" in the memory access control table 36.

In this case, the memory access control unit 42 determines that a writing violation has occurred and notifies the violation instruction executing unit 40B of the secure processing unit 40 via the violation detecting unit 41B of the monitoring unit 41 about violation information containing the physical addresses at which a writing violation is determined to have occurred (i.e., the physical addresses at which the "data 1" is written) and containing the "data 2" representing the target communication data for writing.

Then, the violation instruction executing unit 40B performs a violation response operation and makes the "data 1", which is already written at the physical addresses specified in the violation information, unreadable for the non-secure processing unit 25. Moreover, the violation instruction executing unit 40B writes the "data 2", which represents the target communication data for writing as specified in the violation information, in the shared memory 23A and makes the "data 2" readable for the non-secure processing unit 25.

Hence, as illustrated by a reference numeral 71 in FIG. 11, when seen from the side of the secure mode S, the "data 1" and the "date 2" can be confirmed in the shared memory 23A. However, when seen from the side of the non-secure mode NS, only the "data 2" can be confirmed and the "data 1" cannot be confirmed in the shared memory 23A.

Subsequently, the secure processing unit 40 performs logging and writes the data 1 and the data 2, which are stored in the shared memory 23A, in the storage 28 (SEQ506). Then, the data 2 is read from the shared memory 23A, and is sent to the nodes 12 via the subnetworks NW (SEQ508).

More specifically, the violation response operation is performed as follows.

For example, in the violation response operation, the communication data that is already written in the target physical addresses for writing is moved to new physical addresses that are different than the target physical addresses; the target communication data for writing is written at the target physical addresses for writing; and the memory access control table 36 and the secure page table 35 are updated according to the physical addresses at which the communication data is written.

FIGS. 12 and 13 are explanatory diagrams for explaining the violation response operation. FIG. 12 is a schematic diagram illustrating an example of the non-secure page table 34, the secure page table 35, and the memory access control table 36 when the "data 1" representing the communication data is written in the shared memory 23A.

For example, assume that the "data 1" is written at a physical address "01" in the shared memory 23A. Moreover, assume that a virtual address (for example, "01") corresponding to the physical address "01" is associated in the non-secure page table 34 and the secure page table 35. Furthermore, in the memory access control table 36, the physical address "01" and the state information "locked state" of the "data 1" is registered.

At that time, assume that the memory accessing unit 25A of the non-secure processing unit 25 issues a write request for writing the "data 2" representing new communication data at the physical address "01" at which the "data 1" representing the old communication address is stored.

Then, the memory access control unit 42 determines that a writing violation has occurred. Thus, the memory access control unit 42 notifies the violation instruction executing unit 40B of the secure processing unit 40 via the violation detecting unit 41B of the monitoring unit 41 about violation information containing the physical address at which a writing violation is determined to have occurred (i.e., the physical address "01" at which the "data 1" is written) and containing the "data 2" representing the new communication data to be written.

Then, as illustrated in FIG. 13, the violation instruction executing unit 40B moves the "data 1", which represents the old communication data and which is already written at the physical address "01" specified in the violation information, to a new physical address "02". Moreover, the violation instruction executing unit 40B writes the "data 2", which represents the new communication data specified in the violation information, at the physical address "01" at which the "data 1" representing the old communication data was written.

Then, the violation instruction executing unit 40B updates the secure page table 35 and the memory access control table 36 according to the physical address used for the writing.

Hence, as illustrated in FIG. 13, the "data 1" representing the old communication data is moved from the physical address "01" to the physical address "02". Moreover, in the secure page table 35, a virtual address "02" corresponding to the physical address "02" of the "data 1" is registered. Meanwhile, the "data 2" representing the new communication data is written at the physical address "01", and the virtual address "01" corresponding to the physical address "01" of the "data 2" is registered in the secure page table 35 and the non-secure page table 34.

In this way, since the physical address "02" of the "data 1" representing the old communication data is not registered in the non-secure page table 34, the non-secure processing unit 25 cannot read the "data 1" representing the old communication data.

Meanwhile, alternatively, in the violation response operation, the target communication data for writing can be written in a new physical address different than the target physical address for writing, and the secure page table 35 and the non-secure page table 34 can be updated according to the new physical address used for the writing.

FIGS. 12 and 14 are explanatory diagrams for explaining the violation response information. FIG. 12 is a schematic diagram illustrating an example of the non-secure page table 34, the secure page table 35, and the memory access control table 36 when the "data 1" representing the communication data is written in the shared memory 23A.

For example, assume that the "data 1" is written at the physical address "01" of the shared memory 23A. Moreover, assume that the virtual address "01" corresponding to the physical address "01" is associated in the non-secure page table 34 and the secure page table 35. Furthermore, in the memory access control table 36, the physical address "01" and the state information "locked state" of the "data 1" is registered.

At that time, assume that the memory accessing unit 25A of the non-secure processing unit 25 issues a write request for writing the "data 2" representing new communication data at the physical address "01" at which the "data 1" representing the old communication address is stored.

Then, the memory access control unit 42 determines that a writing violation has occurred and notifies the violation instruction executing unit 40B of the secure processing unit 40 via the violation detecting unit 41B of the monitoring unit 41 about violation information containing the physical address at which a writing violation is determined to have occurred (i.e., the physical address "01" at which the "data 1" is written) and containing the "data 2" representing the target communication data for writing.

Then, as illustrated in FIG. 14, the violation instruction executing unit 40B moves the "data 2" representing the new communication data to the physical address "02" that is different than the physical address "01" specified in the violation information.

Subsequently, the violation instruction executing unit 40B updates the non-secure page table 34 and the secure page table 35.

More specifically, the violation instruction executing unit 40B changes, in the secure page table 35, the virtual address corresponding to the physical address "01" of the "data 1" representing the old communication data to another address (for example, the virtual address "02"). Then, the violation instruction executing unit 40B assigns, as the virtual address corresponding to the physical address "02" of the "data 2" representing the new communication data, the virtual address "01" that was assigned to the "data 1" representing the old communication data.

Moreover, the violation instruction executing unit 40B associates, in the non-secure page table 34, the virtual address "01", which was associated to the physical address of the "data 1" representing the old communication data, to the physical address of the "data 2" representing the new communication data.

Hence, in the non-secure page table 34, the physical address "01" of the "data 1" representing the old communication data no more has a virtual address associated thereto. For that reason, the non-secure processing unit 25 cannot read the "data 1" representing old communication data.

In this way, the violation instruction executing unit 40B performs the violation response operation.

FIG. 15 is a sequence diagram illustrating an exemplary flow of a communication operation performed in the information processing device 10B according to the second embodiment.

The information processing device 10B according to the second embodiment performs operations from SEQ601 to SEQ644 in an identical manner to the operations from SEQ200 to SEQ240 performed in the information processing device 10 according to the first embodiment.

Then, the non-secure application 32 issues a write request to the memory access control unit 42 for performing routing and for writing the frames that include the communication data changed due to routing (SEQ646).

The memory access control unit 42 determines whether or not the write request received at SEQ646 implies a writing violation (SEQ648). If a writing violation is determined to have occurred, then the memory access control unit 42 notifies the violation detecting unit 41B of the monitoring unit 41 about violation information containing the logical addresses at which the writing violation is determined to have occurred and containing the changed communication data (SEQ650).

The violation detecting unit 41B converts the logical addresses specified in the violation information into physical addresses, and the switching unit 27A switches the mode from the non-secure mode NS to the secure mode S. Then, the monitoring unit 41 notifies the secure processing unit 40 about a message (for example, an SMC) indicating that the mode has been switched to the secure mode S (SEQ652). Moreover, the violation detecting unit 41B notifies the secure processing unit 40 about the violation information (SEQ654).

Subsequently, the violation instruction executing unit 40B of the secure processing unit 40 performs the violation response operation (SEQ656).

When the violation response operation is performed, the violation instruction executing unit 40B of the secure processing unit 40 issues a second-type switching instruction to the monitoring unit 41 for switching the mode to the non-secure mode NS (SEQ658).

Then, the switching unit 27A of the monitoring unit 41 switches the mode from the secure mode S to the non-secure mode NS, and sends a message (an SMC) to the non-secure application 32 for indicating that the mode has been switched to the non-secure mode NS (SEQ660).

Subsequently, the information processing device 10B performs operations from SEQ666 to SEQ714 in an identical manner to the operations from SEQ244 to SEQ288 according to the first embodiment.

As explained above, in the information processing device 10B according to the second embodiment, when it is determined that there is a writing violation by the non-secure processing unit 25, the memory access control unit 42 notifies the secure processing unit 40 about violation information containing the physical addresses at which the writing violation has occurred and containing the target communication data for writing. The secure processing unit 40 includes the violation instruction executing unit 40B that performs a violation response operation according to the violation information. In the violation response operation, the communication data that is already written at the physical addresses specified in the violation information is made unreadable for the non-secure processing unit 25; and the communication data specified in the violation information is written in the shared memory 23A and is made readable for the non-secure processing unit 25.

Hence, in the information processing device 10 according to the second embodiment, in addition to achieving the effects according to the first embodiment, the memory size can be further reduced.

Third Modification Example

In the second embodiment, the explanation is given for a case in which the violation instruction executing unit 40B of the secure processing unit 40 performs the violation response operation. Alternatively, a memory managing unit of the processor unit 20 can perform the violation response operation.

In that case, the secure processing unit 40 may not include the violation instruction executing unit 40B, and the monitoring unit 41 may not include the violation detecting unit 41B.

The processor unit 20 gets selectively switched between the secure mode S and the non-secure mode NS, and performs data processing in each mode. In a third modification example, the processor unit 20 includes a memory managing unit 70 that performs the violation response operation.

The memory managing unit 70 has a memory access control function with respect to the shared memory 23A. More specifically, in the third modification example, when it is determined that there is a writing violation by the non-secure processing unit 25, the memory managing unit 70 performs the violation response operation, which is identical to the second embodiment.

Figure 16:
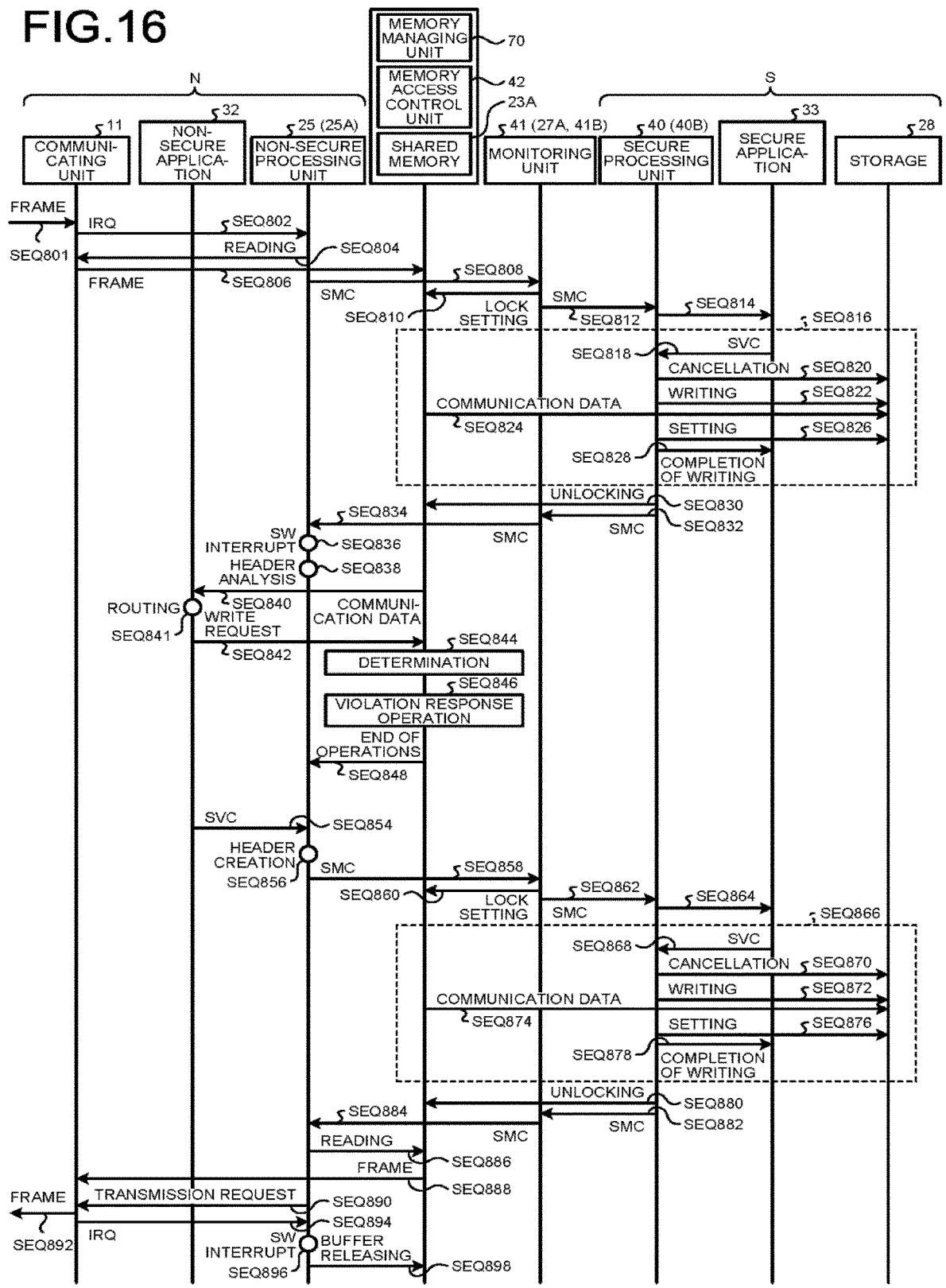

FIG. 16 is a sequence diagram illustrating an exemplary flow of a communication operation performed in the information processing device 10B according to the third modification example.

The information processing device 10B according to the third modification example performs operations SEQ801 to SEQ841 in an identical manner to the operations from SEQ200 to SEQ240 performed in the information processing device 10 according to the first embodiment.

Then, the non-secure application 32 issues a write request to the memory managing unit 70 for performing routing and for writing the frames including the communication data changed due to routing (SEQ842).

The memory managing unit 70 determines whether or not the write request received at SEQ842 implies a writing violation (SEQ844). If it is determined that no writing violation has occurred, then the system control proceeds to SEQ854 (described later). However, if it is determined that a writing violation has occurred, then the memory managing unit 70 converts the logical addresses at which the writing violation is determined to have occurred into the physical addresses, and performs the violation response operation (SEQ846).

When the violation response operation is performed, the memory managing unit 70 sends a signal indicating the completion of operations to the non-secure processing unit 25 (SEQ848).

Then, the information processing device 10B performs operations from SEQ854 to SEQ898 in an identical manner to the operations from SEQ244 to SEQ288 according to the first embodiment.

As explained above, in the information processing device 10B according to the third modification example, the memory managing unit 70 of the processor unit 20 performs the violation response operation.

Thus, in the information processing device 10B, in addition to achieving the effects according to the second embodiment, the memory size can be further reduced.

Supplementary Explanation

A computer program meant for implementing the abovementioned various operations in the information processing devices 10 and 10B can be stored in a hard disk drive (HDD). Alternatively, the computer program meant for implementing the abovementioned various operations in the information processing devices 10 and 10B according to the embodiments can be stored in advance in the ROM 62.

Still alternatively, the computer program meant for implementing the abovementioned various operations in the information processing devices 10 and 10B according to the embodiments can be stored as an installable file or an executable file in a computer-readable memory medium such as a compact disk read only memory (CD-ROM), a compact disk recordable (CD-R), a memory card, a digital versatile disk (DVD), or a flexible disk (FD); and can be provided as a computer program product. Still alternatively, the computer program meant for implementing the abovementioned various operations in the information processing devices 10 and 10B according to the embodiments can be stored in a downloadable manner in a computer connected to a network such as the Internet. Still alternatively, the computer program meant for implementing the abovementioned various operations in the information processing devices 10 and 10B according to the embodiments can be can be distributed via a network such as the Internet.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An information processing device comprising:
a monitoring circuit configured to switch mode between a non-secure mode and a secure mode;
a non-secure processing circuit configured to run in the non-secure mode, and read communication data from and write communication data in a shared memory;
a secure processing circuit configured to run in the secure mode, and read the communication data from the shared memory and write the communication data in a storage; and
a memory access control circuit configured to manage access from the non-secure processing circuit and the secure processing circuit based on a memory access control table in which physical addresses in the shared memory are associated with state information either indicating a locked state for not allowing writing but allowing reading by the non-secure processing circuit or indicating an unlocked state attained by cancelling the locked state, wherein
when it is determined that there is a writing violation by the non-secure processing circuit, the memory access control circuit notifies the secure processing circuit about violation information containing physical addresses at which the violation information is determined to have occurred and containing the communication data to be written, and
the secure processing circuit includes a violation instruction executing circuit that performs a violation response operation in which
according to the violation information, the communication data that is already written at physical addresses specified in the violation information is made unreadable for the non-secure processing circuit, and
the communication data specified in the violation information is written in the shared memory and is made readable for the non-secure processing circuit.

2. The device according to claim 1, wherein
when the communication data is written in the shared memory, the non-secure processing circuit issues a first-type switching instruction to the monitoring circuit for switching mode from the non-secure mode to the secure mode, and
upon receiving the first-type switching instruction, the monitoring circuit switches mode from the non-secure mode to the secure mode and updates, to the locked state, the state information that is specified in the memory access control table and that corresponds to physical addresses at which the communication data is written.

3. The device according to claim 2, wherein
when a certain number of sets of the communication data are written in the shared memory, the non-secure processing circuit issues the first-type switching instruction to the monitoring circuit.

4. The device according to claim 1, wherein
when a first-type switching instruction for switching mode from the non-secure mode to the secure mode is received from a timer circuit, the monitoring circuit switches mode from the non-secure mode to the secure mode and updates, to the locked state, the state information that is specified in the memory access control table and that corresponds to physical addresses at which the communication data is written, and
the timer circuit issues the first-type switching instruction to the monitoring circuit after elapse of a predetermined period of time since previous instance of sending the first-type switching instruction.

5. The device according to claim 1, wherein
when the communication data written in the shared memory is stored in the storage, the secure processing circuit
updates, to the unlocked state, the state information that is specified in the memory access control table and that corresponds to physical addresses of the communication data stored in the storage, and
then issues a second-type switching instruction to the monitoring circuit for switching mode from the secure mode to the non-secure mode, and
upon receiving the second-type switching instruction, the monitoring circuit switches mode from the secure mode to the non-secure mode.

6. The device according to claim 5, wherein
when a certain number of sets of the communication data are written in the shared memory, the secure processing circuit stores the communication data, which is written in the shared memory, in the storage.

7. The device according to claim 1, wherein
in the violation response operation,
the communication data that is already written at target physical addresses for writing is moved to new physical addresses different than the target physical addresses for writing,
the communication data to be written is written at the target physical addresses for writing, and
the memory access control table and a secure page table, which indicates association of virtual addresses used by the secure processing circuit and physical addresses, are updated according to physical addresses at which writing is performed.

8. The device according to claim 1, wherein
in the violation response operation,
the communication data to be written is written at new physical addresses different than target physical addresses for writing, and
a secure page table, which indicates association of virtual addresses used by the secure processing circuit and physical addresses, and a non-secure page table, which indicates association of virtual addresses used by the non-secure processing circuit and physical addresses, are updated according to physical addresses at which writing is performed.

9. An information processing method comprising:
switching, by a monitoring unit, mode between a non-secure mode and a secure mode;
reading-writing, by a non-secure processing unit, that includes running in the non-secure mode, and reading communication data from and writing communication data in a shared memory;
writing, by a secure processing unit, that includes running in the secure mode, and reading the communication data from the shared memory and writing the communication data in a storage; and
managing, by a memory access control unit, access from the non-secure processing unit and the secure processing unit based on a memory access control table in which physical addresses in the shared memory are associated with state information either indicating a locked state for not allowing writing but allowing reading by the non-secure processing unit or indicating an unlocked state attained by cancelling the locked state, wherein when it is determined that there is a writing violation by the non-secure processing unit, violation information is notified to the secure processing unit by the memory access control unit, the violation information containing physical addresses at which the violation information is determined to have occurred and containing the communication data to be written, and the secure processing unit includes a violation instruction executing unit that performs a violation response operation in which according to the violation information, the communication data that is already written at physical addresses specified in the violation information is made unreadable for the non-secure processing unit, and the communication data specified in the violation information is written in the shared memory and is made readable for the non-secure processing unit.

10. A computer program product having a computer readable medium including programmed instructions, wherein the instructions, when executed by a computer, cause the computer to function as:

a monitoring unit configured to switch mode between a non-secure mode and a secure mode;

a non-secure processing unit configured to run in the non-secure mode, and read communication data from and write communication data in a shared memory;

a secure processing unit configured to run in the secure mode, and read the communication data from the shared memory and write the communication data in a storage; and a memory access control unit configured to manage access from the non-secure processing unit and the secure processing unit based on a memory access control table in which physical addresses in the shared memory are associated with state information either indicating a locked state for not allowing writing but allowing reading by the non-secure processing unit or indicating an unlocked state attained by cancelling the locked state, wherein when it is determined that there is a writing violation by the non-secure processing unit, the memory access control unit notifies the secure procession unit about violation information containing physical addresses at which the violation information is determined to have occurred and containing the communication data to be written, and the secure processing unit includes a violation instruction executing unit that performs a violation response operation in which according to the violation information, the communication data that is already written at physical addresses specified in the violation information is made unreadable for the non-secure processing unit, and the communication data specified in the violation information is written in the shared memory and is made readable for the non-secure processing unit.

11. An information processing device comprising:

a monitoring circuit configured to switch mode between a non-secure mode and a secure mode;

a non-secure processing circuit configured to run in the non-secure mode, and read communication data from and write communication data in a shared memory;

a secure processing circuit configured to run in the secure mode, and read the communication data from the shared memory and write the communication data in a storage; and a memory access control circuit configured to manage access from the non-secure processing circuit and the secure processing circuit based on a memory access control table in which physical addresses in the shared memory are associated with state information either indicating a locked state for not allowing writing but allowing reading by the non-secure processing circuit or indicating an unlocked state attained by cancelling the locked state, wherein the processor circuit includes a memory managing circuit configured, when it is determined that there is a writing violation by the non-secure processing circuit, to perform a violation response operation in which the communication data that is already written at physical addresses at which the writing violation is determined to have occurred is made unreadable for the non-secure processing circuit, and the communication data that is to be written but that is determined to be involved in the writing violation is written in the shared memory and is made readable for the non-secure processing circuit.

12. The device according to claim 11, wherein in the violation response operation, the communication data that is already written at target physical addresses for writing is moved to new physical addresses different than the target physical addresses for writing, the communication data to be written is written at the target physical addresses for writing, and the memory access control table and a secure page table, which indicates association of virtual addresses used by the secure processing circuit and physical addresses, are updated according to physical addresses at which writing is performed.

13. The device according to claim 11, wherein in the violation response operation, the communication data to be written is written at new physical addresses different than target physical addresses for writing, and a secure page table, which indicates association of virtual addresses used by the secure processing circuit and physical addresses, and a non-secure page table, which indicates association of virtual addresses used by the non-secure processing circuit and physical addresses, are updated according to physical addresses at which writing is performed.

\* \* \* \* \*